US012637573B2

(12) United States Patent
Tanino

(10) Patent No.: US 12,637,573 B2
(45) Date of Patent: May 26, 2026

(54) ANTIFOULING COATING COMPOSITION

(71) Applicant: CHUGOKU MARINE PAINTS, LTD., Otake (JP)

(72) Inventor: Soichiro Tanino, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 502 days.

(21) Appl. No.: 18/028,231

(22) PCT Filed: Sep. 17, 2021

(86) PCT No.: PCT/JP2021/034244
§ 371 (c)(1),
(2) Date: Mar. 24, 2023

(87) PCT Pub. No.: WO2022/070978
PCT Pub. Date: Apr. 7, 2022

(65) Prior Publication Data

US 2024/0002677 A1 Jan. 4, 2024

(30) Foreign Application Priority Data

Sep. 29, 2020 (JP) ................................ 2020-163841

(51) Int. Cl.

| | |
|---|---|
| ***C08F 2/46*** | (2006.01) |
| ***C08F 2/50*** | (2006.01) |
| ***C08G 61/04*** | (2006.01) |
| ***C09D 5/16*** | (2006.01) |
| ***C09D 7/63*** | (2018.01) |
| ***C09D 7/65*** | (2018.01) |
| ***C09D 183/04*** | (2006.01) |
| ***C09J 7/20*** | (2018.01) |

(52) U.S. Cl.
CPC ............ *C09D 5/1675* (2013.01); *C09D 7/63* (2018.01); *C09D 7/65* (2018.01); *C09D 183/04* (2013.01); *C09J 7/205* (2018.01); *C09J 2203/35* (2020.08); *C09J 2483/00* (2013.01)

(58) Field of Classification Search
CPC ...... C09D 5/00; C09D 5/1687; C09D 5/1675; C09D 183/06; C09D 183/04; C09D 7/63; C09D 7/65; C08G 77/20; C08G 77/46; C08G 77/80; C09J 7/205; C09J 7/29; C09J 7/38; C09J 2483/005; C09J 2483/00; C09J 2203/35; C09J 2433/005; C08L 83/06; C08L 83/00; C08K 5/0025; C08K 5/5425
USPC ................ 522/99, 1, 71, 189, 184, 6; 520/1
See application file for complete search history.

(56) References Cited

U.S. PATENT DOCUMENTS

| | | | | |
|---|---|---|---|---|
| 6,126,991 A | 10/2000 | Stein | | |
| 2007/0275255 A1* | 11/2007 | Ooms | .................... | C09J 183/10 428/447 |
| 2015/0291808 A1 | 10/2015 | Oya et al. | | |

FOREIGN PATENT DOCUMENTS

| | | | | |
|---|---|---|---|---|
| JP | 2001002515 A | 1/2001 | | |
| JP | 2006274267 A | 10/2006 | | |
| JP | 2007505166 A | 3/2007 | | |
| JP | 2010150349 A | 7/2010 | | |
| JP | 2010229370 A | 10/2010 | | |
| JP | 2011021058 A | 2/2011 | | |
| JP | 2016203039 A | 12/2016 | | |
| JP | 2019199600 A * | 11/2019 | ........... | C09D 5/1668 |
| WO | WO-2005007763 A1 | 1/2005 | | |
| WO | WO-2014077204 A1 | 5/2014 | | |

OTHER PUBLICATIONS

Katoka et al, JP 2019199600 Machine Translation, Nov. 21, 2019 (Year: 2019).*
International Search Report issued Nov. 16, 2021 in PCT/JP2021/034244, (with English translation), 5 pages.
Written Opinion issued Nov. 16, 2021 in PCT/JP2021/034244, (with English translation), 8 pages.
Extended European Search Report issued Aug. 19, 2024 in European Patent Application No. 21875280.6, 8 pages.

* cited by examiner

*Primary Examiner* — Jessica Whiteley
(74) *Attorney, Agent, or Firm* — Element IP, PLC

(57) ABSTRACT

An object of the present invention is to provide an antifouling coating composition that can form an antifouling coating film having excellent adhesion to a base (substrate) even in a low-temperature environment, as well as excellent antifouling property. Another object of the present invention is to provide an antifouling coating film, a laminated antifouling coating film, an antifouling tape, a substrate with the antifouling coating film, and a method of producing the same formed from the antifouling coating composition, as well as an antifouling method. The antifouling coating composition of the present invention is an antifouling coating composition containing a photocurable organopolysiloxane (A), a slipping agent (B), and a photopolymerization initiator (C), the content of the photocurable organopolysiloxane (A) in the solid content of the antifouling coating composition being 50% by mass or more and 98% by mass or less.

20 Claims, No Drawings

ANTIFOULING COATING COMPOSITION

TECHNICAL FIELD

The present invention relates to an antifouling coating composition, and an antifouling coating film, a laminated antifouling coating film, an antifouling tape, a substrate with an antifouling coating film and a method of producing the same, as well as an antifouling method using the antifouling coating composition.

BACKGROUND ART

An organopolysiloxane-based antifouling coating film is widely used for the purpose of preventing adhesion of aquatic organisms to ships, underwater structures, fishing materials, and the like from occurring. The antifouling coating film has characteristics such as a low surface free energy and a low elastic modulus, and therefore, in addition to being able to prevent adhesion and fixation of macroorganisms, such as barnacles and mussels, from occurring, it also has excellent advantages of having a low environmental impact compared to conventional hydration-type and hydrolysis-type antifouling coating films that release coating film components into the environment.

For example, PTL 1 discloses an antifouling coating film formed from a curable polysiloxane composition.

CITATION LIST

Patent Literature

PTL 1: WO 2014/077204 A

SUMMARY OF INVENTION

Technical Problem

An organopolysiloxane-based antifouling coating film can reduce adhesion to aquatic organisms; however, it has the disadvantage that it has low adhesion to a base, making it difficult to obtain strong adhesion to the base. In particular, in a low temperature environment (e.g., 5° C.), the tendency becomes remarkable, and as in the above-mentioned PTL 1, a special underlying coating film or the like is required, and even if it is used, there are drawbacks such as requiring a long coating interval from the coating of an undercoat to the coating of an antifouling coating composition.

An object of the present invention is to provide an antifouling coating composition that can form an antifouling coating film having excellent adhesion to a base (substrate) even in a low-temperature environment, as well as excellent antifouling property. In addition, another object of the present invention is to provide an antifouling coating film, a laminated antifouling coating film, an antifouling tape, a substrate with the antifouling coating film, and a method of producing the same formed from the antifouling coating composition, as well as an antifouling method.

Solution to Problem

The present inventors have made intensive studies in view of the above problems, and found that a coating film formed by an antifouling coating composition containing a photocurable organopolysiloxane (A), a slipping agent (B), and a photopolymerization initiator (C) has good adhesion to a substrate even at low temperatures and is also excellent in antifouling property, thus completing the present invention.

The present invention relates to the following [1] to [16].

[1] An antifouling coating composition containing a photocurable organopolysiloxane (A), a slipping agent (B), and a photopolymerization initiator (C), the photocurable organopolysiloxane (A) having a content in a solid content of the antifouling coating composition of 50% by mass or more and 98% by mass or less.

[2] The antifouling coating composition according to [1], wherein the photocurable organopolysiloxane (A) has a (meth)acryloyl group.

[3] The antifouling coating composition according to [1] or [2], wherein the photocurable organopolysiloxane (A) is represented by the following formula (I).

$$X_pR^1_{(3-p)}SiO(SiR^1_2O)_m(SiX_qR^1_{(2-q)}O)_nSiX_pR^1_{(3-p)} \quad (I)$$

In the formula (I), $R^1$'s each independently represent an alkyl group having 1 to 10 carbon atoms, an aryl group, an aralkyl group, an alkoxy group, or a halogenated alkyl group, X's each independently are a monovalent organic group having one or more (meth)acryloyl groups and containing no silicon atom, m represents 10 or more and 10,000 or less, n represents 0 or more and 50 or less, p's each independently are an integer of 0 or more and 2 or less, q's each independently are 1 or 2, and at least one of p and n is 1 or more.

[4] The antifouling coating composition according to any one of [1] to [3], wherein the photocurable organopolysiloxane (A) has a weight average molecular weight (Mw) of 10,000 or more and 100,000 or less.

[5] The antifouling coating composition according to any one of [1] to [4], wherein the photocurable organopolysiloxane (A) has a functional group equivalent of 300 g/mol or more and 50,000 g/mol or less.

[6] The antifouling coating composition according to any one of [1] to [5], wherein the slipping agent (B) is one or more selected from the group consisting of a phenyl-modified silicone, a polyether-modified silicone, and an acrylic polymer having a hydrophilic group.

[7] The antifouling coating composition according to any one of [1] to [6], wherein the slipping agent (B) has a content in the solid content of the antifouling coating composition of 0.1% by mass or more and 40% by mass or less.

[8] The antifouling coating composition according to any one of [1] to [7], wherein a total content of the photocurable organopolysiloxane (A) and the slipping agent (B) in the solid content of the antifouling coating composition is 70% by mass or more and 99% by mass or less.

[9] The antifouling coating composition according to any one of [1] to [8], further containing a silane coupling agent (D).

[10] An antifouling coating film formed from the antifouling coating composition according to any one of [1] to [9].

[11] A laminated antifouling coating film including an underlying coating film and the antifouling coating film according to [10].

[12] An antifouling tape including the antifouling coating film according to [10] or the laminated antifouling coating film according to [11] and a pressure-sensitive adhesive layer.

[13] A substrate with an antifouling coating film, including the antifouling coating film according to [10], a laminated antifouling coating film according to [11], or the antifouling tape according to [12], on a substrate.

[14] The substrate with an antifouling coating film according to [13], wherein the substrate is one selected from the group consisting of a ship, an underwater structure, a fishing material, and a cable.

[15] A method of producing a substrate with an antifouling coating film, including a step of applying the antifouling coating composition according to any one of [1] to [9] to a substrate, and a step of irradiating the applied coating film with an active energy ray.

[16] An antifouling method using the antifouling coating film according to [10], the laminated antifouling coating film according to [11], or the antifouling tape according to [12].

Advantageous Effects of Invention

According to the present invention, an antifouling coating composition that can form an antifouling coating film having excellent adhesion to a base (substrate) even in a low-temperature environment, as well as excellent antifouling property can be provided. According to the present invention, furthermore, an antifouling coating film, a laminated antifouling coating film, an antifouling tape, a substrate with an antifouling coating film and a method of producing the same formed from the antifouling coating composition, as well as an antifouling method can be provided.

DESCRIPTION OF EMBODIMENTS

Hereinafter, the antifouling coating composition according to the present invention, and the antifouling coating film, the laminated antifouling coating film, the antifouling tape, the substrate with the antifouling coating film and the method of producing the same, as well as the antifouling method using the antifouling coating composition are described in detail.

In the following description, "(meth)acryloyl", "(meth) acrylate", "(meth)acrylic acid" and "(meth)acrylic" refer to "acryloyl and/or methacryloyl", "acrylate and/or or methacrylate", "acrylic acid and/or methacrylic acid", and "acrylic and/or methacrylic", respectively.

[Antifouling Coating Composition]

The antifouling coating composition of the present invention (hereinafter also simply referred to as "the present composition" or "coating composition") contains a photocurable organopolysiloxane (A), a slipping agent (B), and a photopolymerization initiator (C), and the content of the photocurable organopolysiloxane (A) in the solid content of the antifouling coating composition is 50% by mass or more and 98% by mass or less.

According to the present invention, it is possible to provide an antifouling coating composition that can form an antifouling coating film having excellent adhesion to a base (substrate) even in a low-temperature environment and further excellent antifouling property. Moreover, by using an antifouling coating material of the present invention, antifouling construction including formation of an antifouling coating film can be completed in a short period of time. In particular, in construction work on ships, there is a great advantage in that it is possible to reduce the economic burden such as docking costs that are required according to the time involved in the work.

Although the detailed mechanism of action by which the above effects are obtained is not necessarily clear, it is partially presumed as follows. That is, in order for the conventional organopolysiloxane-based antifouling coating film to suppress biofouling in water, when aquatic organisms come into contact with the surface of the coating film and are at the stage of growing on the surface after contact, it is necessary to incorporate a slipping agent that facilitates the aquatic organisms to slide off the surface due to the water flow that occurs as the substrate moves through the water, or the water flow that occurs in the water. On the other hand, the slipping agent is usually in a liquid state at room temperature (hereinafter referred to as 25° C.) or becomes liquid upon interaction with water in the external environment. Furthermore, in order to function as a slipping agent, it is necessary to have a certain difference in polarity from the curable organopolysiloxane used in combination. Therefore, even if the curable organopolysiloxane and the slipping agent are in a certain mixed state or in a micro-separated state due to a mixing operation before applying the coating composition, phase separation progresses while the applied coating composition dries and cures, causing the liquid slipping agent to be unevenly distributed near the base (substrate), and in the worst case, to form a liquid layer. As a result, a phenomenon that inhibits adhesion to the base (substrate) may occur. In particular, in a low-temperature environment, the compatibility of components with different polarities is reduced, and phase separation is likely to proceed. Therefore, the influence of the above phenomenon becomes remarkable.

However, in the present composition, by using the photocurable organopolysiloxane (A), the drying and curing time can be greatly shortened, thereby suppressing the occurrence of the phase separation phenomenon and exhibiting good adhesion to the base (substrate).

<Photocurable Organopolysiloxane (A)>

The present composition contains a photocurable organopolysiloxane (A) for the purpose of enhancing adhesion to a substrate in a low-temperature environment (hereinafter also simply referred to as "low-temperature adhesion") and antifouling property of the formed antifouling coating film.

The photocurable organopolysiloxane (A) is an organopolysiloxane compound that initiates polymerization by active species such as radicals generated from a photopolymerization initiator (C) to be described later when irradiated with active energy rays. The proportion of the organopolysiloxane in the molecule of the photocurable organopolysiloxane (A) is preferably 50% by mass or more, more preferably 70% by mass or more, from the viewpoint of good antifouling property of the formed antifouling coating film, etc.

Examples of the photocurable organopolysiloxane (A) include a photo-radically curable organopolysiloxane in which active species generated by the irradiation of the active energy ray for initiating polymerization is a radical, a photo-cationically curable organopolysiloxane in which the active species is a cation, and a photo-anionically curable organopolysiloxane in which the active species is an anion. The photo-radically curable organopolysiloxane is preferred in terms of the curability of the coating composition, the strength and durability of the formed coating film, and a low environmental load, etc. On the other hand, the photo-cationically curable organopolysiloxane and the photo-anionically curable organopolysiloxane are preferred from the viewpoint of more excellent adhesion to the base and resistance to curing inhibition due to oxygen, etc.

When the photocurable organopolysiloxane (A) is a photo-radically curable organopolysiloxane, from the viewpoint that the antifouling coating composition has suitable storage stability, pot life and curability, and that the formed antifouling coating film exhibits good low-temperature adhesion and antifouling property, it is preferably an organopolysiloxane having a (meth)acryloyl group. For example, it is preferably a compound represented by the following formula (I).

Examples of a photo-radically polymerizable group include a vinyl group and an allyl group; however, from the viewpoint of curability, a (meth)acryloyl group is preferred as a photo-radically polymerizable group. Further, a vinyl group directly bonded to a silicon atom has low radical polymerizability, and in the present invention, a vinyl group directly bonded to a silicon atom does not correspond to a photo-radically polymerizable group.

$$X_pR^1_{(3-p)}SiO(SiR^1_2O)_m(SiX_qR^1_{(2-q)}O)_nSiX_pR^1_{(3-p)} \quad (I)$$

In the formula (I), $R^1$'s each independently represent an alkyl group having 1 to 10 carbon atoms, an aryl group, an aralkyl group, an alkoxy group, or a halogenated alkyl group, X's each independently are a monovalent organic group having one or more (meth)acryloyl groups and containing no silicon atom, m represents 10 or more and 10,000 or less, n represents 0 or more and 50 or less, p's each independently are an integer of 0 or more and 2 or less, q's each independently are 1 or 2, and at least one of p and n is 1 or more.

In the formula (I), $R^1$'s each independently are an alkyl group having 1 to 10 carbon atoms, an aryl group, an aralkyl group, an alkoxy group, or a halogenated alkyl group.

The alkyl group represented by $R^1$ has 1 or more and 10 or less carbon atoms, and examples thereof include a methyl group, an ethyl group, a propyl group, a butyl group, a pentyl group, a hexyl group, and a heptyl group.

The aryl group represented by $R^1$ has 6 or more and 10 or less carbon atoms, and may have a substituent, such as an alkyl group, on the aromatic ring thereof. Examples thereof include a phenyl group, a tolyl group (methylphenyl group), a xylyl group (dimethylphenyl group), and a naphthyl group.

The aralkyl group represented by $R^1$ has 7 or more and 10 or less carbon atoms, and examples thereof include a benzyl group, a 2-phenylethyl group, a 2-naphthylethyl group, and a diphenylmethyl group.

The halogenated alkyl group represented by $R^1$ has 1 or more and 10 or less carbon atoms, and examples thereof include groups in which a part or the whole of hydrogen atoms contained in the alkyl group are substituted with a halogen atom, such as a fluorine atom, a chlorine atom, a bromine atom, and an iodine atom.

Of these, $R^1$ in the formula (I) is preferably an alkyl group, an aryl group, an aralkyl group, or a halogenated alkyl group, more preferably an alkyl group or an aryl group, and even more preferably a methyl group.

In addition, in the present specification, when there are a plurality of the same groups such as $R^1$'s, they may be the same as or different from each other.

In the formula (I), X's each independently represent a monovalent organic group having one or more (meth)acryloyl groups and containing no silicon atom, and from the viewpoint of good curability of the coating composition, it is preferably a group having an acryloyl group, more preferably a group having an acryloyloxy group.

X is preferably a group represented by the following formula (II).

[Chem. 1]

(II)

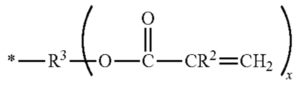

In the formula (II), $R^2$'s each independently represent a hydrogen atom or a methyl group, $R^3$ represents a (1+x)-valent hydrocarbon group having 2 or more and 100 or less carbon atoms; in $R^3$, any methylene group may be substituted with an ether bond, an ester bond, a thioether bond, a urethane bond, or an amide bond; in the hydrocarbon group, a part of the hydrogen atoms may be substituted with a hydroxy group or a halogen atom, and x represents an integer of 1 or more and 10 or less.

In the formula (II), $R^2$ is a hydrogen atom or a methyl group, preferably a hydrogen atom.

$R^3$ represents a (1+x)-valent hydrocarbon group having 2 or more and 100 or less carbon atoms, preferably 2 or more and 50 or less carbon atoms, more preferably 2 or more and 30 or less carbon atoms, and still more preferably 2 or more and 10 or less carbon atoms.

In $R^3$, any methylene group may be substituted with an ether bond, an ester bond, a thioether bond, or an amide bond, preferably substituted with an ether bond or an ester bond, and more preferably substituted with an ether bond.

x is an integer of 1 or more and 10 or less, preferably 1 or 2.

Examples of X include the following (IIa) to (IIg).

[Chem. 2]

(IIa)

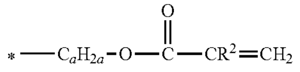

a = 2~6

(IIb)

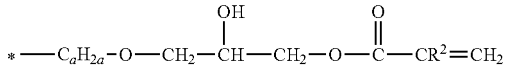

a = 2~6

(IIc)

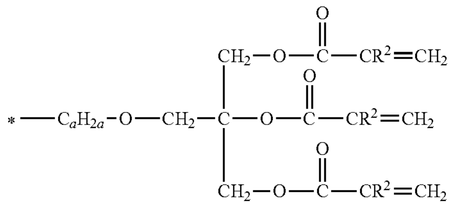

a = 2~6

(IId)

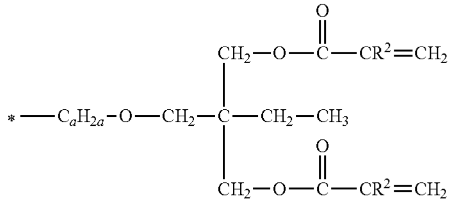

a = 2~6

-continued

[Chem. 3]

(IIe)

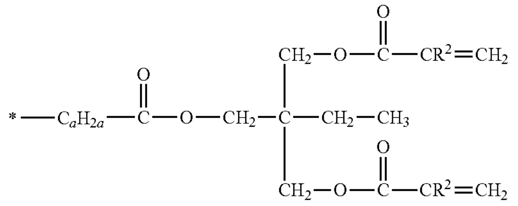

a = 2~6

(IIf)

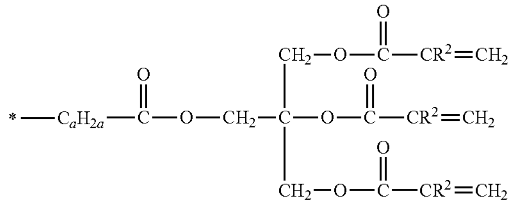

a = 2~6

(IIg)

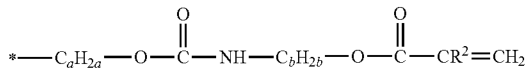

a = 2~6 b = 2~6

Of these, (IIa) to (IIf) are preferable, and (IIb), (IId) are more preferable.

In the description herein, the case where two or more different repeating units are described in parallel to each other in the brackets shows that the repeating units may be repeated in any form or order of a random form, an alternate form, and a block form. Specifically, for example, a formula —$[X_3—Y_3]$— (wherein X and Y each represent a repeating unit) may be any of a random form such as —XXYXYY—, an alternate form such as —XYXYXY—, and a block form such as —XXXYYY— or —YYYXXX—.

In the formula (I), m is 10 or more and 10,000 or less. From the viewpoint of improving physical properties such as flexibility, elongation, conformability to substrate, strength, and impact resistance, as well as antifouling property of the formed antifouling coating film, m is preferably 100 or more, more preferably 200 or more, and is preferably 1,000 or less, more preferably 500 or less.

In the formula (I), n represents 0 or more and 50 or less. However, when p's to be described later are all 0, n is 1 or more and 50 or less. For the same reason as above, n is preferably 2 or more and 20 or less, n/m is preferably 0 or more and ⅕ or less, more preferably 0 or more and 1/20 or less, and even more preferably 0 or more and 1/50 or less.

Note that m and n respectively mean an average repeating number of a corresponding partial structure, and can be appropriately adjusted so as to satisfy the following weight average molecular weight.

In the formula (I), p's each independently are an integer of 0 or more and 2 or less, and when the above n is 0, at least one or more p's are 1 or 2.

On one hand, when the photocurable organopolysiloxane (A) is a photo-cationically curable organopolysiloxane, an organopolysiloxane having a glycidyl group in the molecule thereof can be used. On the other hand, when the photocurable organopolysiloxane (A) is a photo-anionically curable organopolysiloxane, an organopolysiloxane having a glycidyl group or a cyanoacrylate group in the molecule thereof can be used.

The weight average molecular weight (Mw) of the photocurable organopolysiloxane (A) is usually 5,000 or more and 200,000 or less. From the viewpoint of improving the production workability, coating workability, curability of the coating composition, and the strength of the formed antifouling coating film, the weight average molecular weight is preferably 10,000 or more, more preferably 12,000 or more, and still more preferably 15,000 or more, and is preferably 100,000 or less, more preferably 70, 000 or less, and still more preferably 50,000 or less.

In addition, the number average molecular weight of the photocurable organopolysiloxane (A) is, from the viewpoint of improving the production workability, coating workability, curability of the coating composition, and the strength of the formed antifouling coating film, preferably 3,000 or more, more preferably 4,000 or more, and still more preferably 5,000 or more, and is preferably 50,000 or less, more preferably 30,000 or less, and still more preferably 20,000 or less.

In the present invention, the "weight average molecular weight (Mw)" and "number average molecular weight (Mn)" of the photocurable organopolysiloxane (A) and other oligomers/polymers (N) to be described later are determined using GPC (gel permeation chromatography) and calculated by conversion using standard polystyrene with a known molecular weight.

The functional group equivalent (mass per mol of curable functional group) of the photocurable organopolysiloxane (A) is, from the viewpoint of improving the curability, and the strength and antifouling property of the formed antifouling coating film, preferably 300 g/mol or more, more preferably 500 g/mol or more, even more preferably 700 g/mol or more, and still more preferably 1,000 g/mol or more, and is preferably 50,000 g/mol or less, more preferably it is 30,000 g/mol or less, even more preferably 20,000 g/mol or less, still more preferably 15,000 g/mol or less, and particularly preferably 10,000 g/mol or less.

When two or more photocurable organopolysiloxanes (A) are used, the functional group equivalent of the photocurable organopolysiloxane (A) as a whole is preferably within the above range.

The functional group equivalent may be approximated by a value obtained by dividing the number average molecular weight by the number of functional groups per molecule.

In addition, the viscosity of the photocurable organopolysiloxane (A) at 23° C. is, from the viewpoint of improving the production workability, coating workability, curability of the coating composition, and the strength of the formed antifouling coating film, preferable 100 mPa·s or more, more preferably 200 mPa·s or more, and is preferably 50,000 mPa·s or less, more preferably 2,000 mPa·s or less.

In the description herein, the viscosity of the photocurable organopolysiloxane (A) at 23° C. refers to the viscosity measured by a B-type rotational viscometer (for example, model BM, manufactured by Tokyo Keiki Inc.).

The photocurable organopolysiloxane (A) may be used alone or in combination of two or more thereof. In addition, in the following description, when two or more kinds are used in combination, the preferable content is the preferable range as the total amount of the components.

The content of the photocurable organopolysiloxane (A) in the coating composition is, from the viewpoint of improving the antifouling property and strength of the formed antifouling coating film, preferably 40% by mass or more, more preferably 50% by mass or more, and even more preferably 60% by mass or more, and is preferably 98% by mass or less, more preferably 95% by mass or less, and even more preferably 90% by mass or less.

In addition, the content of the photocurable organopolysiloxane (A) in the solid content of the antifouling coating composition is 50% by mass or more, preferably 60% by mass or more, more preferably 70% by mass or more, and still more preferably 80% by mass or more, and is 98% by mass or less, preferably 97% by mass or less, and more preferably 95% by mass or less.

In the description herein, the "solid content of the coating composition" refers to components excluding a non-reactive solvent (E) to be described later and volatile components contained as solvents in each component, and the "content in the solid content of the coating composition" can be calculated as the content in the residue obtained by drying the coating composition in a hot air dryer at 125° C. for 1 hour.

Therefore, the "solid content of the coating composition" does not necessarily mean that it is solid, and it may be liquid.

In addition, the total content of the photocurable organopolysiloxane (A) and the slipping agent (B) to be described later in the solid content of the antifouling coating composition of the present invention is, from the viewpoint of improving the antifouling property and strength of the formed antifouling coating film, preferably 70% by mass or more, more preferably 80% by mass or more, and is preferably 99% by mass or less, more preferably 98% by mass or less.

A commercially available product may be used as the photocurable organopolysiloxane (A). Examples of such commercially available products include "TEGO Rad 2650" manufactured by Evonik Industries AG (in the formula (I), $R^1$ is a methyl group, all p's are 1, n is 0, and X is a group represented by the formula (IId) (a=3), Mw: 17,000, viscosity (23° C.): 380 mPa·s), "SILMER OH ACR C50" ($R^1$ is a methyl group, all p's are 0, q is 1, n is 3, X is a group represented by the formula (IIb) (a=3), Mw: 24,000, viscosity (23° C.): 550 mPa·s) and "SILMER OH ACR Di-400" ($R^1$ is a methyl group, all p's are 1, n is 0, X is a group represented by the formula (IIb) (a=3), Mw: 31,000, viscosity (23° C.): 1,030 mPa·s) manufactured by Siltech corporation.

<Slipping Agent (B)>

The present composition contains a slipping agent (B).

The slipping agent (B) imparts slipperiness to the formed antifouling coating film, thereby improving adhesion inhibition properties (antifouling property) of aquatic organisms. Furthermore, since the present composition contains the slipping agent (B), the surface of the antifouling coating film becomes slippery in water. As a result, it is possible to reduce damage when the substrate coated with the antifouling coating film comes into contact with drifting objects and the like, and to improve workability when installing the substrate (such as an antifouling coating for cables used underwater).

The content of the slipping agent (B) in the solid content of the antifouling coating composition is, from the viewpoint of improving the antifouling property of the formed antifouling coating film, preferably 0.1% by mass or more, more preferably 0.5% by mass or more, and even more preferably 1.0% by mass or more, and is preferably 40% by mass or less, more preferably 30% by mass or less, and even more preferably 25% by mass or less.

The slipping agent (B) preferably has fluidity at 25° C., more preferably is liquid. It is considered that when the slipping agent (B) has fluidity, the mobility in the antifouling coating film is high, and the effect of making the surface slippery (slipperiness) can be enhanced. Also, the viscosity of the antifouling coating composition to be described later can be reduced and the applicability thereof can be improved.

The slipping agent (B) is preferably one or more selected from oils and a polymer having a hydrophilic group.

Examples of the oils include silicone oils other than the photocurable organopolysiloxane (A), paraffin oils, and fats and oils, among which the silicone oils are preferred.

Examples of the paraffin oils include liquid paraffin.

Fats and oils are esters of fatty acids and glycerin, and examples thereof include animal oils and fats and vegetable oil.

Examples of the polymer having a hydrophilic group include an acrylic polymer having a hydrophilic group and polyalkylene glycol from the viewpoint of the antifouling property and adhesion of the formed antifouling coating film, and an acrylic polymer having a hydrophilic group is preferred.

Examples of polyalkylene glycol include polyethylene glycol, polypropylene glycol, a copolymer of ethylene glycol and propylene glycol, and an alkyl ether thereof.

That is, the slipping agent (B) is preferably one or more selected from a silicone oil, a paraffin oil, fats and oils, an acrylic polymer having a hydrophilic group, and polyalkylene glycol, more preferably one or more selected from a silicone oil and an acrylic polymer having a hydrophilic group, and even more preferably one or more selected from the group consisting of phenyl-modified silicone, polyether-modified silicone, and an acrylic polymer having a hydrophilic group. In addition, from the viewpoint of coating with excellent coating workability and good antifouling property and damage resistance of the formed antifouling coating film, etc., it is also preferable to include both a silicone oil and an acrylic polymer having a hydrophilic group.

The silicone oil and the acrylic polymer having a hydrophilic group, which are suitable slipping agents (B), will be described in detail below.

<Silicone Oil (B1)>

Examples of the silicone oil (B1) used in the antifouling coating composition of the present invention include dimethylsilicone (polydimethylsiloxane, unmodified silicone) and modified silicone. Modified silicone is obtained by substituting a portion of the methyl groups of dimethyl silicone with organic groups other than methyl groups, and does not substantially contain photocurable reactive groups such as the photocurable organopolysiloxane (A) described above.

Since silicone oil has low interfacial tension and does not easily change properties even in a low-temperature environment, it easily migrates to the surface of the antifouling coating film, and can efficiently improve the adhesion (antifouling property) of aquatic organisms and damage resistance.

The viscosity of the silicone oil (B1) at 25° C. is, from the viewpoint of improving the applicability of the antifouling coating composition, imparting slipperiness to the formed antifouling coating film, and improving the antifouling property, preferably 10 mPa·s or more, more preferably 20 mPa·s or more, even more preferably 40 mPa·s or more, still more preferably 60 mPa·s or more, and further more preferably 80 mPa·s or more, and is preferably 50,000 mPa·s or less, more preferably 20,000 mPa·s or less, and still more preferably 10,000 mPa·s or less.

In the description herein, the viscosity of the silicone oil (B1) at 25° C. refers to the viscosity measured with a B-type rotational viscometer.

In addition, the kinematic viscosity of the silicone oil (B1) at 25° C. is, from the viewpoint of improving the applicability of the antifouling coating composition, imparting slipperiness to the formed antifouling coating film, and improving the antifouling property, preferably 10 $mm^2$/sec or more, more preferably 20 $mm^2$/sec or more, even more preferably 40 $mm^2$/sec or more, still more preferably 60 $mm^2$/sec or more, and further more preferably 80 $mm^2$/sec or more, and is preferably 50,000 $mm^2$/sec or less, more preferably 20,000 $mm^2$/sec or less, and still more preferably 10,000 $mm^2$/sec or less.

In the description herein, the kinematic viscosity of the silicone oil (B1) at 25° C. refers to the viscosity measured with an Ubbelohde viscometer in accordance with JIS Z 8803:2011.

Examples of the modified silicone include a phenyl-modified silicone, a polyether-modified silicone, a long-chain alkyl-modified silicone, a higher fatty acid ester-modified silicone, a fluoroalkyl-modified silicone, a carbinol-modified silicone, a carboxy-modified silicone, an amino-modified silicone, a mercapto-modified silicone, and a phenol-modified silicone.

Of these modified silicones, from the viewpoint of imparting a moderate thixotropy to the antifouling coating composition, improving its applicability and improving the antifouling property and damage resistance of the formed antifouling coating film, the silicone oil (B1) is preferably one or more selected from a phenyl-modified silicone and a polyether-modified silicone, more preferably a polyether-modified silicone, and it is also preferable to use a phenyl-modified silicone and a polyether-modified silicone together.

Examples of the structure of the modified silicone include a side-chain modified type, a dual-end modified type, a single-end modified type, a block type, and a side-chain and dual-end modified type.

A commercially available product may be used as the dimethyl silicone. Examples of the commercially available product include "KF-96-1,000cs" (manufactured by Shin-Etsu Chemical Co., Ltd., kinematic viscosity (25° C.): 1,000 $mm^2$/sec).

The phenyl modification rate of the phenyl-modified silicone is, from the viewpoint of facilitating the formation of the antifouling coating film and improving the antifouling property of the formed antifouling coating film, preferably 3% or more, more preferably 4% or more, and is preferably 50% or less, more preferably 20% or less, and still more preferably 10% or less. The phenyl modification rate is the percentage of the number of phenyl groups with respect to the total number of phenyl groups and methyl groups bonded to silicon.

The kinematic viscosity of the phenyl-modified silicone at 25° C. is, from the viewpoint of improving the coating workability of the antifouling coating composition and improving the antifouling property of the formed antifouling coating film, preferably 10 $mm^2$/sec or more, more preferably 30 $mm^2$/sec or more, and still more preferably 50 $mm^2$/sec or more, and is preferably 50,000 $mm^2$/sec or less, more preferably 10,000 $mm^2$/sec or less, and still more preferably 6,000 $mm^2$/sec or less.

A commercially available product may be used as the phenyl-modified silicone. Examples of the commercially available products include "KF-50-1,000cs" (manufactured by Shin-Etsu Chemical Co., Ltd., phenyl modification rate=5%, kinematic viscosity (25° C.): 1,000 $mm^2$/sec) and "KF-50-100cs" (manufactured by Shin-Etsu Chemical Co., Ltd., phenyl modification rate=5%, kinematic viscosity (25° C.): 100 $mm^2$/sec).

When the present composition contains a phenyl-modified silicone, the content thereof in the solid content of the antifouling coating composition is preferably 0.1% by mass or more, more preferably 1% by mass or more, and still more preferably 3% by mass or more, and is preferably 40% by mass or less, more preferably 30% by mass or less, and still more preferably 20% by mass or less, from the viewpoint of improving the antifouling property, formation efficiency, and damage resistance of the antifouling coating film.

Examples of the structure of the polyether-modified silicone include a side-chain modified type, a dual-end modified type, a block type, and a side-chain and dual-end modified type, and the side-chain modified type and the dual-end modified type are preferred.

Examples of the polyether (polyalkylene glycol) that constitutes the polyether group (polyalkylene glycol group) of the polyether-modified silicone include polyethylene glycol, polypropylene glycol, and a copolymer of ethylene glycol and propylene glycol, and polyethylene glycol is preferred.

From the viewpoint of facilitating the formation of the antifouling coating film and improving the antifouling property of the formed antifouling coating film, the proportion of the polyether partial structure in the structure of the polyether-modified silicone is preferably 10% by mass or more, more preferably 15% by mass or more, and is preferably 50% by mass or less, more preferably 40% by mass or less.

When the antifouling coating composition contains a polyether-modified silicone, the content thereof in the solid content of the antifouling coating composition is, from the viewpoint of facilitating the formation of the antifouling coating film and improving the antifouling property of the formed antifouling coating film, preferably 0.1% by mass or more, more preferably 0.5% by mass or more, and still more preferably 1% by mass or more, and is preferably 20% by mass or less, more preferably 10% by mass or less, and still more preferably 7% by mass or less.

When the present composition contains a polyether-modified silicone containing an ethyleneoxy ($—C_2H_4O—$) structural unit and/or an acrylic polymer (B2) having a hydrophilic group having an ethyleneoxy ($—C_2H_4O—$) structure to be described later, from the viewpoint of imparting good antifouling property and damage resistance to the formed antifouling coating film, the total mass of the ethyleneoxy ($—C_2H_4O—$) partial structure is preferably 0.1 parts by mass or more, more preferably 0.3 parts by mass or more, and is preferably 10 parts by mass or less, more preferably 5 parts by mass, with respect to 100 parts by mass of the dimethylsiloxane partial structure ($—(CH_3)_2Si—O—$) in the antifouling coating film.

The dimethylsiloxane partial structure includes dimethylsiloxane partial structures derived from the photocurable organopolysiloxane (A), the silicone oil (B1), the organopolysiloxane (N1) and other photocurable oligomers/polymers (N2) to be described later.

From the viewpoint of improving the coating workability of the antifouling coating composition and the antifouling property of the formed antifouling coating film, the kinematic viscosity of the polyether-modified silicone at 25° C. is preferably 10 $mm^2$/sec or more, preferably 50 $mm^2$/sec or more, more preferably 100 $mm^2$/sec or more, and is preferably 5000 $mm^2$/sec or less, more preferably 2000 $mm^2$/sec or less, and still more preferably 500 $mm^2$/sec or less.

A commercially available product may be used as the polyether-modified silicone. Examples of the commercially available product include "X-22-4272" (manufactured by Shin-Etsu Chemical Co., Ltd., dual-end type, kinematic viscosity (25° C.): 270 $mm^2$/sec), "KF-6020" (manufactured by Shin-Etsu Chemical Co., Ltd., side-chain type, proportion of polyether partial structure=20% by mass, kinematic viscosity (25° C.): 180 $mm^2$/sec), "FZ-2203" (manufactured by Dow Corning Toray Co., Ltd., side-chain type), and "FZ-2160" (manufactured by Dow Corning Toray Co., Ltd., block type).

When the present composition contains the silicone oil (B1), the content thereof in the solid content of the antifouling coating composition is, from the viewpoint of facilitating the formation of the antifouling coating film and improving the antifouling property of the formed antifouling coating film, preferably 0.1% by mass or more, more preferably 1% by mass or more, and still more preferably 3% by mass or more, and is preferably 40% by mass or less, more preferably 30% by mass or less, and still more preferably 25% by mass or less.

[Acrylic Polymer Having a Hydrophilic Group (B2)]

The acrylic polymer (B2) having a hydrophilic group used in the present composition preferably contains a structural unit derived from a monomer having a hydrophilic group, more preferably contains a structural unit derived from a monomer having a hydrophilic group and a structural unit derived from a hydrophobic monomer, and even more preferably consists of a structural unit derived from a monomer having a hydrophilic group and a structural unit derived from a hydrophobic monomer.

The content of the structural unit derived from a monomer having a hydrophilic group in the acrylic polymer (B2) having a hydrophilic group is preferably 1% by mass or more, more preferably 3% by mass or more, still more preferably 5% by mass or more, even more preferably 10% by mass or more, and particularly preferably 20% by mass or more, and is 100% by mass or less, preferably 80% by mass or less, more preferably 70% by mass or less, still more preferably 60% by mass or less, and even more preferably 50% by mass or less.

Since the acrylic polymer has a hydrophilic group, when the formed antifouling coating film is installed in water, it is thought that the hydrophilic part of the acrylic polymer dissolves or swells, and gradually migrates to the surface of the antifouling coating film, thereby effectively preventing the adhesion of aquatic organisms. In addition, since the acrylic polymer has an acrylic structure, it is considered that by slowly hydrolyzing and changing the affinity with water, the acrylic polymer gradually migrates to the surface of the antifouling coating film, and as a result, the antifouling property can be maintained for a long period of time.

From the viewpoint of improving the antifouling property and damage resistance of the formed antifouling coating film, etc., the hydrophilic group of the monomer having a hydrophilic group is preferably an ether group or a hydroxy group, more preferably an ether group, even more preferably a polyether group, and still more preferably a polyethyleneoxy group.

In addition, the content of the structural unit derived from the hydrophobic monomer in the acrylic polymer (B2) having a hydrophilic group is preferably 99% by mass or less, more preferably 97% by mass or less, even more preferably 95% by mass or less, still more preferably 90% by mass or less, and particularly preferably 80% by mass or less, and is preferably 20% by mass or more, more preferably 30% by mass or more, even more preferably 40% by mass or more, and still more preferably 50% by mass or more.

It is considered that since the acrylic polymer has a hydrophobic monomer, it has a high affinity with other components of the antifouling coating composition, such as the photocurable organopolysiloxane (A), and can exhibit uniform slipperiness on the surface of the antifouling coating film.

From the viewpoint of improving the antifouling property and damage resistance of the formed antifouling coating film, etc., the monomer having a hydrophilic group is preferably a monomer having a polyalkylene glycol group and a monomer having a hydroxy group, more preferably a monomer having a polyalkylene glycol group.

Specifically, from the viewpoint of improving the antifouling property, one or more selected from polyalkylene glycol (meth)acrylate, hydroxyalkyl (meth)acrylate, alkoxyalkyl (meth)acrylate, tetrahydrofurfuryl (meth)acrylate, 4-(meth)acryloylmorpholine and vinylpyrrolidone are preferable, one or more selected from polyalkylene glycol (meth)acrylate and hydroxyalkyl (meth)acrylate are more preferable, and polyalkylene glycol (meth)acrylate is even more preferable.

Examples of the polyalkylene glycol (meth)acrylate include those in which one end of polyalkylene glycol is bonded to (meth)acrylic acid directly via an ester bond or a linking group, and the remaining other end thereof is a hydroxy group or an alkoxy group, and an alkoxy group is preferable.

Of these, the polyalkylene glycol (meth)acrylate in which one end of polyalkylene glycol is bonded to (meth)acrylic acid directly via an ester bond is preferable, and the polyalkylene glycol (meth)acrylate in which the remaining other end is an alkoxy group is more preferable.

The (meth)acrylic acid at an end is preferably an acrylic acid or a methacrylic acid, more preferably an acrylic acid.

Examples of the alkoxy group at an end include a methoxy group, a phenoxy group, and an octoxy group, and the alkoxy group is preferably a methoxy group or a phenoxy group, more preferably a methoxy group.

The polyalkylene glycol constituting the polyalkylene glycol (meth)acrylate is preferably polyethylene glycol, polypropylene glycol, or a copolymer of ethylene glycol and propylene glycol, more preferably polyethylene glycol.

The average number of alkylene glycol units constituting the polyalkylene glycol in the polyalkylene glycol (meth) acrylate is preferably 2 or more, more preferably 3 or more, and still more preferably 5 or more, and is preferably 25 or less, more preferably 15 or less, and still more preferably 12 or less.

Specific examples of the polyalkylene glycol (meth) acrylate include polyethylene glycol mono(meth)acrylate, polypropylene glycol mono(meth)acrylate, poly(ethylene glycol-propylene glycol) mono(meth)acrylate, poly(ethylene glycol-butylene glycol) mono(meth)acrylate, methoxypolyethylene glycol mono(meth)acrylate, aryloxypoly(ethylene glycol-propylene glycol) mono(meth)acrylate, phenoxypoly (ethylene glycol-propylene glycol) methacrylate, octoxypoly(ethylene glycol-propylene glycol) mono(meth)acrylate, dodecyloxypolyethylene glycol mono(meth)acrylate, octadecyloxypolyethylene glycol mono(meth)acrylate, and nonylphenoxypolypropylene glycol acrylate or the like, and methoxypolyethylene glycol mono(meth)acrylate is preferred.

A commercially available product may be used as the polyalkylene glycol (meth)acrylate. Examples of the commercially available product include NK Ester AM-90G (methoxypolyethylene glycol #400 acrylate), NK Ester AM-130G (methoxypolyethylene glycol #550 acrylate), NK Ester M-90G (methoxypolyethylene glycol #400 methacrylate), and NK Ester M-230G (methoxypolyethylene glycol #1000 methacrylate), all of which are manufactured by Shin-Nakamura Chemical Co., Ltd.; Light Acrylate MTG-A (methoxy-triethylene glycol acrylate), Light Acrylate EC-A (ethoxy-diethylene glycol acrylate), Light Acrylate EHDG-AT (2-ethylhexyl-diethylene glycol acrylate), and Light Ester 041MA (methoxy polyethylene glycol methacrylate), all of which are manufactured by Kyoeisha Chemical Co., Ltd.; Blemmer ANP-300 (nonylphenoxypolypropylene glycol acrylate), Blemmer AP-400 (polypropylene glycol monoacrylate), Blemmer-70PEP-350B (polyethylene glycol polypropylene glycol monomethacrylate), Blemmer-55PET-800 (polyethylene glycol tetramethylene glycol monomethacrylate), and Blemmer 50POEP-800B (octoxypolyethylene glycol polypropylene glycol methacrylate), all of which are manufactured by NOF Corporation; and Viscoat #MTG (methoxypolyethylene glycol acrylate), manufactured by Osaka Organic Chemical Industry, Ltd.

Examples of the hydroxyalkyl (meth)acrylate include hydroxyethyl (meth)acrylate, hydroxypropyl (meth)acrylate, and hydroxybutyl (meth)acrylate.

A commercially available product may be used as the hydroxyalkyl (meth)acrylate. Examples of the commercially available product include Light Ester HOA (N) (2-hydroxyethyl acrylate), Light Ester HO-250 (N) (2-hydroxyethyl methacrylate), and Light Ester HOP (N) (2-hydroxypropyl methacrylate), all of which are manufactured by Kyoeisha Chemical Co., Ltd.

Examples of the alkoxyalkyl (meth)acrylate include methoxyethyl (meth)acrylate.

The tetrahydrofurfuryl (meth)acrylate is preferably tetrahydrofurfuryl acrylate or tetrahydrofurfuryl methacrylate, more preferably tetrahydrofurfuryl acrylate.

The 4-(meth)acryloylmorpholine is preferably 4-acryloylmorpholine or 4-methacryloylmorpholine, and more preferably 4-acryloylmorpholine.

Examples of the vinylpyrrolidone include 1-vinyl-2-pyrrolidone (N-vinyl-2-pyrrolidone), 3-acetyl-1-vinylpyrrolidin-2-one, and 3-benzoyl-1-vinylpyrrolidin-2-one, and 1-vinyl-2-pyrrolidone is preferred.

In addition, examples of the monomer having a hydrophilic group further include a (meth)acrylic acid.

Examples of the hydrophobic monomer include an alkyl (meth)acrylate having a branched, linear or cyclic alkyl group having 1 or more and 30 or less carbon atoms, an aryl (meth)acrylate having an aromatic group having 6 or more and 10 or less carbon atoms, and a (meth)acrylic group-containing silicone, with an alkyl (meth)acrylate and a (meth)acrylic group-containing silicone being preferred, and an alkyl (meth)acrylate being more preferred.

The number of carbon atoms in the alkyl group of the alkyl (meth)acrylate is preferably 1 or more and 30 or less, more preferably 4 or more and 18 or less, still more preferably 4 or more and 8 or less, and even more preferably 4 or more and 6 or less.

In addition, the alkyl group is branched, linear or cyclic, preferably branched or linear, more preferably branched.

Specific examples of the alkyl (meth)acrylate include methyl (meth)acrylate, ethyl (meth)acrylate, propyl (meth) acrylate, isopropyl (meth)acrylate, n-butyl (meth)acrylate, isobutyl (meth)acrylate, tert-butyl (meth)acrylate, n-pentyl (meth)acrylate, hexyl (meth)acrylate, cyclohexyl (meth) acrylate, n-octyl (meth)acrylate, isooctyl (meth)acrylate, 2-ethylhexyl (meth)acrylate, 3,5,5-trimethylhexyl (meth) acrylate, lauryl (meth)acrylate, cetyl (meth)acrylate, stearyl (meth)acrylate, isostearyl (meth)acrylate, phenyl (meth) acrylate, and benzyl (meth)acrylate. Of these, n-butyl (meth) acrylate, isobutyl (meth)acrylate, and 2-ethylhexyl (meth) acrylate are preferred.

The number of carbon atoms in the aromatic group of the aryl (meth)acrylate is preferably 6 or more and 10 or less, more preferably 6 or more and 7 or less.

Specific examples of the aryl (meth)acrylate include phenyl (meth)acrylate and benzyl (meth)acrylate.

Examples of the (meth)acrylic group-containing silicone include a methacrylic group-containing silicone and an acrylic group-containing silicone, with the methacrylic group-containing silicone being preferred.

(Meth)acrylic group-containing silicones are preferably those in which the (meth)acrylic group is bonded to one end of the silicone main chain via a linking group and those in which the (meth)acrylic group is directly bonded to one end of the silicone main chain, and are preferably those in which the (meth)acrylic group is bonded to one end of the silicone main chain via a linking group.

The linking group is preferably a trimethylene group.

The silicone main chain is preferably composed of linear or branched dimethylsilicone (polydimethylsiloxane), and more preferably composed of linear dimethylsilicone.

Further, it is more preferable that an alkyl group having 1 or more and 6 or less carbon atoms is present at the end opposite to the (meth)acrylic group, and preferably a butyl group is present.

A commercially available product may be used as the (meth)acrylic group-containing silicone. Examples of the commercially available product include Silaplane TM-0701T (tris(trimethylsiloxy)silylpropyl methacrylate), Silaplane FM-0711 (methacrylic group-containing dimethylpolysiloxane, number average molecular weight: 1,000), and Silaplane FM-0721 (methacrylic group-containing dimethylpolysiloxane, number average molecular weight: 5,000), all of which are manufactured by JNC Corporation.

By including (meth)acrylic group-containing silicone, the antifouling property of the formed antifouling coating film can be improved.

The acrylic polymer (B2) having a hydrophilic group is obtained by polymerizing the hydrophilic monomer and the hydrophobic monomer described above, and a known method using a polymerization initiator can be employed as the polymerization method.

From the viewpoint of improving the viscosity of the antifouling coating composition and the antifouling property of the formed antifouling coating film, the weight-average molecular weight (Mw) of the acrylic polymer (B2) having a hydrophilic group is preferably 1,000 or more, more preferably 3,000 or more, still more preferably 5,000 or more, and even more preferably 7,000 or more, and is preferably 30,000 or less, more preferably 15,000 or less.

When the weight-average molecular weight (Mw) of the acrylic polymer (B2) having a hydrophilic group is within the above range, it is preferable in terms of imparting good antifouling property and damage resistance to the formed antifouling coating film.

When the present composition contains an acrylic polymer (B2) having a hydrophilic group, the content thereof in the solid content of the antifouling coating composition is, from the viewpoint of antifouling property and damage resistance of the formed antifouling coating film, preferably 0.1% by mass or more, more preferably 1% by mass or more, and still more preferably 3% by mass or more, and is preferably 40% by mass or less, more preferably 20% by mass or less, still more preferably 10% by mass or less, and even more preferably 5% by mass or less.

<Photopolymerization Initiator (C)>

The present composition contains a photopolymerization initiator (C). The photopolymerization initiator (C) may be any initiator that generates active species such as radicals when irradiated with active energy rays.

As an initiator that generates radicals when irradiated with active energy rays, a conventionally known photopolymerization initiator such as a phosphine oxide-based polymerization initiator, an acetophenone-based polymerization initiator, a benzoin-based polymerization initiator, a benzophenone-based polymerization initiator, and a thioxanthone-based polymerization initiator can be used. Of these, a phosphine oxide-based polymerization initiator is preferably used from the viewpoint of improving the curability of the coating composition even with ultraviolet light having a relatively long wavelength.

Examples of the phosphine oxide-based polymerization initiator include a monoacylphosphine oxide such as 2,4,6-trimethylbenzoyldiphenylphosphine oxide and 2,4,6-trimethylbenzoylethoxyphenylphosphine oxide; and a bisacylphosphine oxide such as bis(2,6-dimethoxybenzoyl)-2,4,4-trimethylphenylphosphine oxide and bis(2,4,6-trimethylbenzoyl)-(2,4-bis-pentyloxyphenyl)phosphine oxide.

Examples of the acetophenone-based polymerization initiator include benzyl dimethyl ketal (also known as 2,2-dimethoxy-2-phenylacetophenone), diethoxyacetophenone, 4-phenoxydichloroacetophenone, 4-tert-butyl-dichloroacetophenone, 4-tert-butyl-trichloroacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexylphenylketone, and 2-methyl-1-[4-(methylthio)phenyl]-2-morpholinopropan-1-one.

Examples of the benzoin-based polymerization initiator include benzoin, benzoin methyl ether, benzoin ethyl ether, benzoin isopropyl ether, benzoin isobutyl ether, and 2,2-dimethoxy-1,2-diphenylethan-1-one.

Examples of the benzophenone-based polymerization initiator include benzophenone, [4-(methylphenylthio)phenyl] phenylmethanone, 4-hydroxybenzophenone, 4-phenylbenzophenone, and 3,3',4,4'-tetra(tert-butylperoxycarbonyl) benzophenone.

Examples of the thioxanthone-based polymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, and 2,4-diisopropylthioxanthone.

On the other hand, examples of initiators that generate cations when irradiated with active energy rays include sulfonium salt compounds and iodonium salt compounds, and examples of initiators that generate anions include 2-(9-oxoxanthen-2-yl)propionic acid 1,5,7-triazabicyclo [4.4.0]dec-5-ene.

The photopolymerization initiator (C) may be used alone or in combination of two or more thereof.

In the present composition, the content of the photopolymerization initiator (C) in the solid content of the antifouling coating composition with respect to a total of 100 parts by mass of the solid content of the components (A) and (B) is preferably 0.1 parts by mass or more, more preferably 1.0 part by mass or more, and still more preferably 1.5 parts by mass or more, and is preferably 10 parts by mass or less, more preferably 5 parts by mass or less.

<Optional Component>

The present composition may contain, in addition to the photocurable organopolysiloxane (A), the slipping agent (B), and the photopolymerization initiator (C), a silane coupling agent (D), a non-reactive solvent (E), a polymerization inhibitor (F), an antifoaming agent (G), a light stabilizer (H), an ultraviolet absorber (I), an inorganic filler (J), an organic coloring pigment (K), a photosensitizer (L), a photopolymerizable monomer (M), other oligomers/polymers (N), an organism repellent (O), a dehydrating agent (P), an anti-sagging and anti-settling agent (Q), a curing catalyst (R), an organosilicon crosslinking agent (S), an antistatic agent (T), an enzyme (U), a flame retardant (V), a thermal conductivity improver (W), an antifogging agent (X), etc., depending on necessity within a range that does not impair the effects of the present invention.

[Silane Coupling Agent (D)]

The present composition may contain a silane coupling agent (D) for the purpose of improving the adhesion between the formed antifouling coating film and the substrate or the base.

As the silane coupling agent (D), a compound having a hydrolyzable group-bonded silane and a reactive group or a partial condensate thereof, for example, a compound represented by the following formula (D1) or a partial condensate thereof is preferably used.

[Chem. 4]

$$(R^{21}O)_wR^{22}_{(3-w)}Si—R^{23}—Z \qquad (D1)$$

In the formula (D1), $R^{21}$ and $R^{22}$ each independently represent an alkyl group having 1 or more and 10 or less carbon atoms, an alkenyl group, an aryl group, or a halogenated alkyl group, preferably a methyl group or an ethyl group.

In the formula (D1), $R^{23}$ is a divalent hydrocarbon group having 1 to 20 carbon atoms, which may be interposed by an amino group (—NR—, wherein R represents a hydrogen atom or a hydrocarbon group having 1 or more and 10 or less carbon atoms), an ether group (—O—), a thioether group (—S—), an ester group (—C(═O)—O—), or an amide group (—C(═O)—NR—, wherein R represents a hydrogen atom or a hydrocarbon group having 1 or more and 10 or less carbon atoms), preferably a propylene group.

In the formula (D1), Z is a reactive group, preferably a (meth)acryloyloxy group, more preferably an acryloyloxy group, from the viewpoint of improving the antifouling property of the formed coating film.

In the formula (D1), w is an integer of 2 or 3, preferably 3.

Examples of such silane coupling agents (D) include 3-acryloyloxypropyltrimethoxysilane, 3-acryloyloxypropylmethyldimethoxysilane, 3-acryloyloxypropyltriethoxysilane, 3-acryloyloxypropylmethyldiethoxysilane, 3-methacryloyloxypropyltrimethoxysilane, 3-methacryloyloxypropylmethyldimethoxysilane, 3-methacryloyloxypropyltriethoxysilane, 3-methacryloyloxypropylmethyldiethoxysilane, 3-aminopropyltrimethoxysilane, and 3-amino propyltriethoxysilane, and 3-acryloyloxypropyltrimethoxysilane is preferably used.

A commercially available product may be used as the silane coupling agent (D). For example, "KBM-5103" (3-acryloyloxypropyltrimethoxysilane) manufactured by Shin-Etsu Chemical Co., Ltd. and the like can be used.

These silane coupling agents (D) may be used alone or in combination of two or more thereof.

When the present composition contains a silane coupling agent (D), the content of the silane coupling agent (D) in the solid content of the coating composition is, from the viewpoint of improving adhesion to the substrate or underlying coating film of the formed antifouling coating film, preferably 0.1% by mass or more, more preferably 0.2% by mass or more, and still more preferably 0.5% by mass or more, and is preferably 10% by mass or less, more preferably 5% by mass or less, and still more preferably 3% by mass or less.

[Non-Reactive Solvent (E)]

The present composition may contain a non-reactive solvent (E) for the purpose of improving the production workability and coating workability of the composition.

Examples of the non-reactive solvent (E) include an aromatic hydrocarbon organic solvent, an aliphatic hydrocarbon organic solvent, an alicyclic hydrocarbon organic solvent, a ketone organic solvent, and an ester organic solvent. Among these, an aromatic hydrocarbon organic solvent, an aliphatic hydrocarbon organic solvent, and an alicyclic hydrocarbon organic solvent are preferred.

Examples of the aromatic hydrocarbon organic solvent include toluene, xylene, and mesitylene.

Examples of the aliphatic hydrocarbon organic solvent include pentane, hexane, heptane, octane, and mineral spirits.

Examples of the alicyclic hydrocarbon organic solvent include cyclohexane, methylcyclohexane, and ethylcyclohexane.

Examples of the ketone organic solvent include acetylacetone, acetone, methyl ethyl ketone, methyl isobutyl ketone, methyl amyl ketone (also known as 2-heptanone), and dimethyl carbonate.

Examples of the ester organic solvent include propylene glycol monomethyl ether acetate.

These non-reactive solvents (E) may be used alone or in combination of two or more thereof.

When the present composition contains a non-reactive solvent (E), the content of the non-reactive solvent (E) in the coating composition can be appropriately adjusted according to the viscosity of the coating composition. However, the content of the non-reactive solvent (E) in the coating composition is preferably 1% by mass or more, more preferably 3% by mass or more, and still more preferably 5% by mass or more, and from the viewpoint of suppressing sagging during coating application, is preferably 40% by mass or less, more preferably 25% by mass or less, and still more preferably 15% by mass or less.

The non-reactive solvent may be added during preparation of the antifouling coating composition, or may be premixed with other components.

In the present invention, by keeping the content of the non-reactive solvent (E) low, it becomes possible to carry out a photocuring step without carrying out a drying step, and the antifouling coating film can be formed in a shorter time, which is preferable.

[Polymerization Inhibitor (F)]

The present composition may contain a polymerization inhibitor (F) for the purpose of improving the storage stability, production workability, and coating workability of the coating composition.

Examples of the polymerization inhibitor (F) include quinones such as p-benzoquinone, naphthoquinone, tolquinone, 2,5-diphenyl-p-benzoquinone, hydroquinone, 2,5-di-tert-butylhydroquinone, methylhydroquinone, and mono-tert-butylhydroquinone; aromatics such as 4-methoxyphenol, and 2,6-di-tert-butylcresol (also known as dibutylhydroxytoluene, BHT); and p-tert-butylcatechol. Among them, aromatics are preferred, and 4-methoxyphenol and 2,6-di-tert-butylcresol are particularly preferred. These can be used alone or in combination of two or more thereof.

When the present composition contains the polymerization inhibitor (F), the content of the polymerization inhibitor (F) in the solid content of the coating composition is preferably 0.001% by mass or more, more preferably 0.005% by mass or more, and is preferably 0.1% by mass or less, more preferably 0.05% by mass or less.

[Antifoaming Agent (G)]

The present composition may contain an antifoaming agent (G) for the purpose of improving the production workability and coating workability of the composition, and improving the strength and antifouling property of the formed antifouling coating film.

As the antifoaming agent (G), fluorine-based, silicone-based, and acrylic antifoaming agents can be used, and fluorine-based antifoaming agents are particularly preferred. Moreover, the antifoaming agent (G) may be used in combination of two or more kinds thereof.

As the antifoaming agent (G), a commercially available product can be used, and examples thereof include "BYK-066N" (a fluorine-based antifoaming agent) manufactured by BYK-Chemie Japan Co., Ltd.

When the present composition contains the antifoaming agent (G), the content of the antifoaming agent (G) in the solid content of the coating composition is preferably 0.001% by mass or more, more preferably 0.01% by mass or more, and is preferably 5% by mass or less, more preferably 1% by mass or less.

[Light Stabilizer (H)]

The present composition may contain a light stabilizer (H) for the purpose of further suppressing yellowing of the antifouling coating film due to ultraviolet rays such as sunlight.

Examples of the light stabilizer (H) include a hindered amine light stabilizer, which may be modified or oligomerized. These may be used alone or in combination of two or more thereof.

As the hindered amine light stabilizer, a commercially available product can be used, and examples thereof include "TINUVIN 123" (decanedioic acid bis(2,2,6,6-tetramethyl-1-(octyloxy)-4-piperidinyl) ester, a mixture of a reaction product of 1,1-dimethylethyl hydroperoxide and octane and a polymer of dimethyl succinate and 4-hydroxy-2,2,6,6-tetramethyl-1-piperidineethanol), "TINUVIN 111FDL" (N,N',N",N'"-tetrakis-(4,6-bis-(butyl-(N-methyl-2,2,6,6-tetramethylpiperidine-4-yl)amino)-triazin-2-yl)-4,7-diazadecane-1,10-diamine), "TINUVIN144" (bis(1,2,2,6,6-pentamethyl-4-piperidyl) [[3,5-bis(1,1-dimethylethyl)-4-hydroxyphenyl]methyl]butylmalonate), and "TINUVIN292" (a mixture of bis(1,2,2,6,6-pentamethyl-4-piperidyl)sebacate and methyl 1,2,2,6,6-pentamethyl-4-piperidyl sebacate), all of which are manufactured by BASF Japan Ltd.; "ADK STAB LA-82" (1,2,2,6,6-pentamethylpiperidin-4-yl methacrylate) and "ADK STAB LA-87" (2,2,6,6-pentamethylpiperidin-4-yl methacrylate), both of which are manufactured by ADEKA Co., Ltd.; and "HOSTAVIN 3058" (1-(1-acetyl-2,2,6,6-tetramethylpiperidin-4-yl)-3-dodecylpyrrolidine-2,5-dione) manufactured by Clariant Japan Co., Ltd.

When the light stabilizer (H) is used, the content thereof is not particularly limited; however, it is preferably 0.1% by mass or more and 5% by mass or less in the solid content of the coating composition.

[Ultraviolet Absorber (I)]

The present composition may contain an ultraviolet absorber (I) for the purpose of maintaining good antifouling property of the formed antifouling coating film and good adhesion to the substrate or the base.

Examples of the ultraviolet absorber (I) include benzotriazole-based ultraviolet absorbers such as 2-(2-hydroxy-5-methylphenyl)benzotriazole and 2-(3,5-di-tert-butyl-2-hydroxyphenyl)benzotriazole;

benzophenone-based ultraviolet absorbers such as 2,4-dihydroxybenzophenone and 2-hydroxy-4-methoxybenzophenone;

hydroxyphenyltriazine-based ultraviolet absorbers;

salicylate-based ultraviolet absorbers such as phenyl salicylate and 4-tert-butylphenyl salicylate; and cyanoacrylate-based ultraviolet absorbers such as ethyl 2-cyano-3,3-diphenylcyanoacrylate and 2-ethylhexyl 2-cyano-3,3-diphenylcyanoacrylate.

In addition, the ultraviolet absorber (I) may have a functional group that reacts with other components in the coating composition when irradiated with active energy rays.

The ultraviolet absorber (I) may be used alone or in combination of two or more thereof.

A commercially available product can be used as the ultraviolet absorber (I). Examples of the benzotriazole-based ultraviolet absorbers include “RUVA-93” (2-[2-hydroxy-5-[2-(methacryloyloxy)ethyl]phenyl]-2H-benzotriazole) manufactured by Otsuka Chemical Co., Ltd., “DAINSORBT-84” (2-(4-allyloxy-2-hydroxyphenyl)-2H-benzotriazole) manufactured by Daiwa Kasei Co., Ltd., and “Tinuvin928” (2-(2H-benzotriazol-2-yl)-6-(1-methyl-1-phenylethyl)-4-(1,1,3,3,-tetramethylbutyl)phenol) manufactured by BASF Japan Ltd.

Examples of the benzophenone-based ultraviolet absorbers include “Chimassorb81” (2-hydroxy-4-octoxybenzophenone) manufactured by BASF Japan Ltd., and examples of the hydroxyphenyltriazine-based ultraviolet absorbers include “Tinuvin400” (a mixture of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine), “Tinuvin460” (2,4-bis(2-hydroxy-4-butyroxyphenyl)-6-(2,4-bis-butyroxyphenyl)-1,3,5-triazine), “Tinuvin405” (2-[4-[(2-hydroxy-3-(2-ethylhexyloxy)propyl)oxy]-2-hydroxyphenyl]-4,6-bis(2,4-dimethylphenyl)-1,3,5-triazine), and “Tinuvin479” (2-(2-hydroxy-4-(isooctyloxycarbonylethoxy)phenyl)-4,6-bis(4-phenylphenyl)-1,3,5-triazine), all of which are manufactured by BASF Japan Ltd.

When the present composition contains the ultraviolet absorber (I), the content of the ultraviolet absorber (I) in the solid content of the coating composition is 10% by mass or less, more preferably 5% by mass or less.

[Inorganic Filler (J)]

The present composition may contain an inorganic filler (J) for the purpose of improving the strength, antifouling property, and visibility of the formed antifouling coating film.

Examples of the inorganic filler (J) include silica, alumina, titanium oxide, iron oxide, zinc oxide, zirconium oxide, indium oxide, vanadium oxide, cerium oxide, antimony oxide, talc, tungsten carbide, titanium carbide, silicon carbide, calcium carbonate, magnesium carbonate, aluminum sulfate, barium sulfate, calcium sulfate, magnesium sulfate, glass fibers, and glass flakes, and of these, it is preferable to contain silica.

Among the inorganic fillers (J), for those with high active energy ray transmittance, such as silica, fine particles having an average particle diameter of 1 nm or more and 200 nm or less are preferably used, and more preferably those having an average particle diameter of 10 nm or more and 100 nm or less are used, from the viewpoint of improving the curability of the coating composition and the adhesion between the formed antifouling coating film and the substrate or the base. The average particle diameter is the median diameter (d50) of a volume-based particle size distribution measured by a dynamic light scattering method, and it can be measured, for example, using a laser diffraction particle size distribution analyzer (“SALD-2200” manufactured by Shimadzu Corporation). Alternatively, it can be calculated as an average value of the diameters of the fine particles when a cured film is observed using a scanning electron microscope or a transmission electron microscope.

When the present composition contains silica, surface-untreated hydrophilic silica may be used, or surface-treated silica may be used. Examples of the surface-treated silica include silica surface-treated by reaction with methyltrichlorosilane, dimethyldichlorosilane, hexamethyldisilazane, a coupling agent, or a polymer, and such surface treatment renders the silica hydrophobic. As a result, aggregation in the antifouling coating composition can be prevented and the storage stability can be improved. As the surface-treated silica, for example, reactive silica having a (meth)acryloyl group on the silica surface may be used. The reactive silica can be obtained, for example, by reacting silica with a hydrolysable silane having a (meth)acryloyl group and a hydrolysable group such as a methoxy group and an ethoxy group in the molecule. In such an embodiment, when the present composition is cured by irradiation with an active energy ray, the strength and the like of the coating film formed by reacting the reactive silica with the component (A) and being incorporated into the coating film can be improved.

As the inorganic filler (J), a powdery one may be used, or an inorganic fine particle sol in which fine particles of the inorganic filler are dispersed in a dispersion medium may be used.

Examples of the dispersion medium for the inorganic fine particle sol include water; a monohydric alcohol solvent such as methanol, ethanol, isopropanol, n-propanol, isobutanol and n-butanol; a polyhydric alcohol solvent such as ethylene glycol and propylene glycol; a polyhydric alcohol derivative such as ethylene glycol monomethyl ether, ethylene glycol monobutyl ether, propylene glycol monomethyl ether, and propylene glycol monobutyl ether; and a ketone solvent such as methyl ethyl ketone, methyl isobutyl ketone, diacetone alcohol, and cyclohexanone. Among these, water, methanol, ethanol, isopropanol, methyl ethyl ketone, methyl isobutyl ketone, and propylene glycol monomethyl ether are preferred from the viewpoint of ease of production of the coating composition.

The content of the inorganic filler (J) in the present composition does not include the dispersion medium.

Such inorganic fillers (J) may be used alone or in combination of two or more thereof.

A commercially available product can be used as the inorganic filler (J). Examples of the inorganic filler in a powdery form include “Aerosil 50” (average primary particle size 30 nm, silica without surface treatment), “Aerosil 300” (average primary particle size 7 nm, silica without surface treatment), “Aerosil R972” (average primary particle size 7 nm, silica surface-treated with dimethyldichlorosilane), “Aerosil R202” (average primary particle size 14 nm, silica surface-treated with dimethyl silicone oil), etc., "AluC" (average primary particle size 13 nm, alumina), and "TiO2 P25" (average primary particle size 21 nm, titanium oxide), all of which are manufactured by Nippon Aerosil Co., Ltd.

Examples of the inorganic fine particle sol include "MIBK-SD" (methyl isobutyl ketone-dispersed silica sol, silica content 30%, particle size 10 to 15 nm), "PGM-AC-4130Y" (propylene glycol monomethyl ether-dispersed silica sol, silica content 30%, particle size 40 to 50 nm), and "MEK-ST-ZL" (methyl ethyl ketone-dispersed silica sol, silica content 30%, particle size 70 to 100 nm), all of which are manufactured by Nissan Chemical Corporation; "SIRMIBK30 WT %-1124" (methyl isobutyl ketone-dispersed silica sol, silica content 30%), "SIRPA15 WT %-H10" (methyl isobutyl ketone-dispersed silica sol, silica content 15%), "SIRPGM30 WT %-E80" (propylene glycol monomethyl ether-dispersed silica sol, silica content 30%), "RTTMIBK20 WT %-H36" (methylisobutylketone-dispersed titanium oxide sol, titanium oxide content 15%), and "ZNMIBK15 WT %-E05" (methylisobutylketone-dispersed zinc oxide sol, zinc oxide content 15%), all of which are manufactured by CIK Nanotech Co., Ltd.

When the present composition contains the inorganic filler (J), the content of the inorganic filler (J) in the solid content of the coating composition is preferably 0.1% by mass or more, more preferably 0.5% by mass or more, and is preferably 20% by mass or less, more preferably 10% by mass or less.

[Organic Coloring Pigment (K)]

The present composition may contain an organic coloring pigment (K) for the purpose of improving the visibility of the antifouling coating composition and the formed antifouling coating film, thereby improving the coating workability during production.

Specific examples of the organic coloring pigment (K) include a soluble azo pigment such as lake red C and brilliant carmine 6B; an insoluble azo pigment such as toluidine red, permanent carmine FB, fast yellow G, disazo yellow AAA and disazo orange PMP; a condensed azo pigment such as chromophthal yellow 3G; a chelate azo pigment; a phthalocyanine pigment such as phthalocyanine blue and phthalocyanine green; a condensed polycyclic pigment such as indanthron blue, quinacridone red and dioxazine violet; an organic pigment such as alkali blue, aniline black, a daylight fluorescent pigment, a nitro pigment and a nitroso pigment, and carbon black.

The organic coloring pigment (K) may be used alone or in combination of two or more thereof.

When the present composition contains the organic coloring pigment (K), the content of the organic coloring pigment (K) in the solid content of the coating composition is preferably 0.1% by mass or more, more preferably 0.3% by mass or more, and is preferably 10% by mass or less, more preferably 5% by mass or less.

[Photosensitizer (L)]

The present composition may contain a photosensitizer (L) for the purpose of improving the curability of the antifouling coating composition.

In the present composition, the photosensitizer (L) can be used in combination with the photopolymerization initiator (C). Specific examples of the photosensitizer (L) include triethanolamine, methyldiethanolamine, triisopropanolamine, methyl 4-dimethylaminobenzoate, ethyl 4-dimethylaminobenzoate, isoamyl 4-dimethylaminobenzoate, 4,4-dimethylaminobenzophenone, and 4,4-diethylaminobenzophenone.

The photosensitizer (L) may be used alone or in combination of two or more thereof.

When the present composition contains the photosensitizer (L), the content of the photosensitizer (L) in the solid content of the coating composition is preferably 0.1% by mass or more, more preferably 0.3% by mass or more, and is preferably 10% by mass or less, more preferably 5% by mass or less.

[Photopolymerizable Monomer (M)]

The present composition may contain a photopolymerizable monomer (M) other than the components described in the preceding paragraphs for the purpose of improving the production workability and coating workability of the antifouling coating composition, the antifouling property of the formed coating film and the adhesion to the substrate or the base, as well as being used as a diluent for other components.

Examples of the photopolymerizable monomer (M) include a monofunctional monomer such as those exemplified as the monomers from which the acrylic polymer (B2) is derived;

an isocyanato group-containing monofunctional monomer such as 2-acryloyloxyethyl isocyanate; and a polyfunctional monomer such as 1,9-nonanediol di(meth)acrylate, neopentyl glycol di(meth)acrylate, di(meth)acrylate of ethylene oxide adduct of neopentyl glycol, di(meth)acrylate of propylene oxide adduct of neopentyl glycol, polyethylene glycol di(meth)acrylate, polypropylene glycol di(meth)acrylate, di(meth) acrylate of ethylene oxide adduct of bisphenol A, glycerin tri(meth)acrylate, trimethylolpropane tri (meth)acrylate, pentaerythritol tri(meth)acrylate, pentaerythritol tetra(meth)acrylate, tetra(meth)acrylate of ethylene oxide adduct of pentaerythritol, ditrimethylolpropane tetra(meth)acrylate, dipentaerythritol penta (meth)acrylate, dipentaerythritol hexa(meth)acrylate, hexa(meth)acrylate of ε-caprolactone adduct of dipentaerythritol, and hexa(meth)acrylate of ethylene oxide adduct of dipentaerythritol.

Among these, from the viewpoint of improving adhesion in a short time after curing (irradiation with active energy rays), a photopolymerizable monomer having a polar group is preferable, a photopolymerizable monomer having at least one of a carboxylic acid, an isocyanato group, a hydroxy group, and an amino group is more preferable, and an acrylic acid is even more preferable.

The photopolymerizable monomer (M) may be used alone or in combination of two or more thereof.

When the present composition contains the photopolymerizable monomer (M), the content of the photopolymerizable monomer (M) in the solid content of the coating composition is preferably 1% by mass or more, more preferably 2% by mass or more, and is preferably 30% by mass or less, more preferably 15% by mass or less.

[Other Oligomers/Polymers (N)]

For the purpose of improving the strength of the formed antifouling coating film and the adhesion to the substrate or the base, the present composition may contain oligomers/polymers (N) other than the components (A) and (B).

The oligomer/polymer (N) other than the components (A) and (B) may be used alone or in combination of two or more thereof.

Examples of the other oligomer/polymer (N) include organopolysiloxane (N1) that does not have photocurable property (hereinafter also simply referred to as "organopolysiloxane (N1)"). The proportion of the organopolysiloxane in the molecule of the organopolysiloxane (N1) is preferably 50% by mass or more.

Examples of the organopolysiloxane (N1) include, for example, those that form a three-dimensional crosslinked structure and cure by having a reactive group in its molecule and the reactive group reacting with each other, or the reactive group reacting with the photocurable organopolysiloxane (A) or a reactive group of an organosilicon crosslinker (S) to be described later. Examples of the reaction of these reactive groups include, for example, a condensation reaction and an addition reaction, and examples of the condensation reaction include a dealcoholization reaction, a deoximation reaction, a deacetone reaction.

As the organopolysiloxane (N1), a commercially available product can be used, and examples thereof include "DMS-S35" manufactured by GELEST, Inc., and "KE-441" and "KE-445" manufactured by Shin-Etsu Chemical Co., Ltd.

When the present composition contains the organopolysiloxane (N1), the content of the organopolysiloxane (N1) in the solid content of the coating composition is preferably 1% by mass or more, more preferably 3% by mass or more, and is preferably 40% by mass or less, more preferably 30% by mass or less.

Examples of the other oligomer/polymer (N) include, among the compounds that initiate polymerization due to active species such as radicals generated from the photopolymerization initiator (C) by irradiation with active energy rays, a photocurable oligomer/polymer (N2) other than the photocurable organopolysiloxane (A). The proportion of organopolysiloxane in the molecule of the other photocurable oligomer/polymer (N2) is less than 50% by mass.

Examples of the other photocurable oligomer/polymer (N2) include urethane (meth)acrylate, polyester (meth)acrylate, and epoxy (meth)acrylate.

Urethane (meth)acrylate is an oligomer/polymer having one or more bonds of a (meth)acryloyloxy group and urethane in the molecule thereof. For example, it can be obtained from the reaction of a (meth)acrylate having a hydroxy group in the molecule thereof with a polyisocyanate, or from the reaction of a hydroxy group-containing polyester with a (meth)acrylate having an isocyanato group.

As the other photocurable oligomer/polymer (N2), commercially available products can be used, and examples thereof include "CN991" (aliphatic urethane acrylate, functional group number: 2, weight average molecular weight: 1,500) manufactured by Sartomer Corporation, "KRM8200" (aliphatic urethane acrylate, functional group number: 6, weight average molecular weight: 1,000) and "EBECRYL220" (aromatic urethane acrylate, functional group number: 6, weight average molecular weight: 1,000) manufactured by Daicel Allnex Co., Ltd., "ARONIX M-8560" (polyester acrylate) manufactured by Toagosei Co., Ltd., and "VR-77" (epoxy acrylate, functional group number: 1.9, weight average molecular weight 510) manufactured by Showa Denko K.K.

When the present composition contains the other photocurable oligomer/polymer (N2), the content of the photocurable oligomer/polymer (N2) in the solid content of the coating composition is preferably 1% by mass or more, more preferably 2% by mass or more, and is preferably 40% by mass or less, and more preferably 25% by mass or less.

Examples of the other oligomers/polymers (N) include an oligomer/polymer (N3) other than the organopolysiloxane (N1) and other photocurable oligomers/polymers (N2).

Examples of the other oligomer/polymer (N3) include poorly water-soluble or water-insoluble resins other than the component (B), such as an acrylic resin, an acrylic silicone resin, an unsaturated polyester resin, a fluororesin, a polybutene resin, a urethane resin (rubber), a polyamide resin, a vinyl chloride copolymer resin, a chlorinated rubber (resin), a chlorinated olefin resin, a styrene-butadiene copolymer resin, an ethylene-vinyl acetate copolymer resin, a vinyl chloride resin, an alkyd resin, a coumarone resin, a petroleum resin or the like.

[Organism Repellent (O)]

The present composition may contain an organism repellent (O) for the purpose of further improving the antifouling property of the formed antifouling coating film.

Examples of the organism repellent (O) include an organic organism repellent such as 4,5-dichloro-2-n-octyl-4-isothiazolin-3-one (also known as DCOIT), (+/−)-4-[1-(2,3-dimethylphenyl)ethyl]-1H-imidazole (also known as medetomicline), 4-bromo-2-(4-chlorophenyl)-5-(trifluoromethyl)-1H-pyrrole-3-carbonitrile (also known as tralopyril), a borane-nitrogen-based base adduct (such as pyridine-triphenylborane and 4-isopropylpyridine diphenylmethylborane), N,N-dimethyl-N'-(3,4-dichlorophenyl)urea (also known as DCMU), N-(2,4,6-trichlorophenyl) maleimide, 2-methylthio-4-tert-butylamino-6-cyclopropylamino-1,3,5-triazine, 2,4,5,6-tetrachloroisophthalonitrile, chloromethyl-n-octylclisulfide, N,N-dimethyl-N'-phenyl-(N'-fluorodichloromethylthio)sulfamide, tetraalkylthiuram disulfide, 2,3-dichloro-N-(2',6'-diethylphenyl)maleimide, and 2,3-dichloro-N-(2'-ethyl-6'-methylphenyl)maleimide;

an inorganic organism repellent such as cuprous oxide, copper rhodanite, and copper; and an organic-inorganic composite organism repellent such as copper pyrithione, zinc pyrithione, bisdimethyldithiocarbamoyl zinc ethylenebisdithiocarbamate, and zinc climethyldithiocarbamate, zinc ethylenebisdithiocarbamate. From the viewpoint of improving the curability of the antifouling coating composition and the adhesion of the formed antifouling coating film to the substrate, it is preferable to use an organic organism repellent, and it is more preferable to use DCOIT and medetomidine.

The organism repellent (O) may be used alone or in combination of two or more thereof.

When using an inorganic organism repellent or an organic-inorganic composite organism repellent as the organism repellent (O), it is preferable to use fine particles.

When the present composition contains the organism repellent (O), the content of the organism repellent (O) in the solid content of the coating composition is, from the viewpoint of improving the antifouling property of the formed antifouling coating film, preferably 0.05% by mass or more, more preferably 0.1% by mass or more, and is preferably 20% by mass or less, more preferably 10% by mass or less.

[Dehydrating Agent (P)]

The present composition may contain a dehydrating agent (P) for the purpose of improving the storage stability of the coating composition.

As the dehydrating agent (P), for example, a zeolite known by the general name of "molecular sieve", porous alumina, an orthoester such as an orthoformic acid alkyl ester, an orthoboric acid, an isocyanate and the like can be used. These dehydrating agents may be used alone or in combination of two or more thereof.

When the present composition contains the dehydrating agent (P), the content of the dehydrating agent (P) in the solid content of the coating composition is, from the viewpoint of improving the storage stability of the coating composition, preferably 0.1% by mass or more, more preferably 0.5% by mass or more, and is preferably 10% by mass or less, more preferably 5% by mass or less.

[Anti-Sagging and Anti-Settling Agent (Q)]

The present composition may contain an anti-sagging and anti-settling agent (Q).

Examples of the anti-sagging and anti-settling agent (Q) include an organoclay-based wax (such as a stearate salt, a lecithin salt, and an alkyl sulfonate of Al, Ca, or Zn), an organic wax (such as a polyethylene wax, an oxidized polyethylene wax, an amide wax, a polyamide wax, and a hydrogenated castor oil wax), and a mixture of an organoclay-based wax and an organic wax.

As the anti-sagging and anti-settling agent (Q), a commercially available product can be used, and examples thereof include "Disparlon 305", "Disparlon 4200-20", and "Disparlon A630-20X", all of which are manufactured by Kusumoto Chemicals, Ltd.

In the case where the present composition contains the anti-sagging and anti-settling agent (Q), the content of the anti-sagging and anti-settling agent (Q) in the solid content of the coating composition is preferably 0.01% by mass or more, and more preferably 0.1% by mass or more, and is preferably 10% by mass or less, and more preferably 3% by mass or less.

[Curing Catalyst (R)]

The present composition may contain a curing catalyst (R) for the purpose of improving the curability of the composition and the strength of the formed antifouling coating film.

In particular, when the present composition contains the component (N1), it preferably contains a curing catalyst (R).

Examples of the curing catalyst (R) include a tin catalyst such as dibutyltin dilaurate when the component (N1) contains a condensation reaction-curable organopolysiloxane, and a platinum catalyst when the component (N1) contains an addition reaction-curable organopolysiloxane.

[Organosilicon Crosslinker (S)]

The present composition may contain an organosilicon crosslinker (S) other than the components described in the preceding paragraphs for the purpose of improving the curability of the composition and the strength of the formed antifouling coating film.

The organosilicon crosslinker (S) is preferably a compound represented by the following formula (S1) and/or a partial condensate thereof.

$$R^{51}{}_{d}SiY_{(4-d)} \qquad (S1)$$

In the formula (S1), $R^{51}$ represents a hydrocarbon group having 1 or more and 6 or less carbon atoms, Y's each independently represent a hydrolyzable group, and d represents an integer of 0 to 2.

In the formula (S1), $R^{51}$'s each independently represent a hydrocarbon group having 1 or more and 6 or less carbon atoms, and examples thereof include a linear or branched alkyl group such as a methyl group, an ethyl group, and a propyl group, a cyclic alkyl group such as a cyclohexyl group, an alkenyl group such as a vinyl group, and an aryl group such as a phenyl group. Among these, a methyl group and an ethyl group are preferred.

When d is 2, a plurality of $R^{51}$'s may be the same with or different from each other.

In the formula (S1), Y's each independently represent a hydrolyzable group, and examples of the hydrolyzable group include an alkoxy group such as a methoxy group and an ethoxy group, and an oxime group such as an ethylmethylketoxime group.

Here, d represents an integer of 0 or more and 2 or less, and is preferably 0 from the viewpoint of improving the curability and film strength of the antifouling coating film.

As the organosilicon crosslinker (S), a commercially available product can be used, and examples thereof include "Ethyl silicate 28" (tetraethyl orthosilicate) manufactured by Colcoat Corporation, "WACKER SILICATE TES 40 WN" (a condensate of tetraethyl orthosilicate) manufactured by Asahi Kasei Wacker Silicone Co., Ltd., and "KBM-13" (trimethoxymethylsilane) manufactured by Shin-Etsu Chemical Co., Ltd.

The organosilicon crosslinker (S) may be used alone or in combination of two or more thereof.

When the antifouling coating composition of the present invention contains the organosilicon crosslinker (S), the content of the organosilicon crosslinker (S) in the solid content of the coating composition is, from the viewpoint of adjusting the curing speed of the composition and improving the strength of the formed antifouling coating film, preferably 0.1% by mass or more, and more preferably 0.2% by mass or more, and is preferably 10% by mass or less, and more preferably 5% by mass or less.

[Antistatic Agent (T)]

The present composition may contain an antistatic agent (T).

Specific examples of the antistatic agent include a cationic antistatic agent such as an amidinium salt, a guanidinium salt and a quaternary ammonium salt an anionic antistatic agent such as a sulfonate, a higher alcohol sulfuric ester salt, an alkylene oxide adduct sulfuric ester salt of higher alcohols, a higher alcohol phosphoric ester salt, and an alkylene oxide adduct phosphoric ester salt of higher alcohols; and a nonionic antistatic agent such as an alkylene oxide adduct of higher alcohols and a fatty acid ester of polyhydric alcohols. The antistatic agent (T) may be used alone or in combination of two or more thereof.

When the present composition contains the antistatic agent (T), the content of the antistatic agent (T) in the solid content of the composition is preferably 0.1% by mass or more, and more preferably 0.5% by mass % or more, and is preferably 10% by mass or less, and more preferably 5% by mass or less.

[Enzyme (U)]

The present composition may contain an enzyme (U) for the purpose of improving the antifouling property of the formed antifouling coating film.

Examples of the enzyme (U) include serine protease, cysteine protease, metalloproteinase, cellulase, hemicellulase, pectinase, and glycosidase.

In the case where the present composition contains the enzyme (U), the content of the enzyme (U) in the solid content of the coating composition is preferably 0.0005% by mass or more, and more preferably 0.01% by mass or more, and is preferably 5% by mass or less, and more preferably 0.1% by mass or less.

[Flame Retardant (V)]

The present composition may contain a flame retardant (V). Examples of the flame retardant (V) include an antimony oxide and a paraffin oxide.

The flame retardant (V) may be used alone or in combination of two or more thereof.

In the case where the present composition contains the flame retardant (V), the content of the flame retardant (V) in the solid content of the coating composition is preferably 0.01% by mass or more, and more preferably 0.1% by mass or more, and is preferably 20% by mass or less, and more preferably 1% by mass or less.

[Thermal Conductivity Improver (W)]

The present composition may contain a thermal conductivity modifier (W). Examples of the thermal conductivity modifier (W) include a boron nitride.

The thermal conductivity improver (W) may be used alone or in combination of two or more thereof.

In the case where the present composition contains the thermal conductivity improver (W), the content of the thermal conductivity improver in the solid content of the coating composition is preferably 0.01% by mass or more, more preferably 0.1% by mass or more, and is preferably 20% by mass or less, more preferably 1% by mass or less.

[Anti-Fogging Agent (X)]

The present composition may contain an antifogging agent (X). Examples of the antifogging agent (X) include nonionic surfactants such as fatty acid esters of polyhydric alcohols, amines of higher fatty acids, amides of higher fatty acids, sucrose fatty acid esters, and ethylene oxide adducts of amines and amides of higher fatty acids.

The antifogging agent (X) may be used alone or in combination of two or more thereof.

In the case where the present composition contains the antifogging agent (X), the content of the antifogging agent (X) in the solid content of the coating composition is preferably 0.1% by mass or more and 10% by mass or less.

[Method of Preparing Antifouling Coating Composition]

The present composition can be prepared by mixing each component in a predetermined ratio, and dissolving or dispersing each component as necessary.

The present composition may be a single-pack type coating material composed of one component, or may be a multi-pack type coating material composed of two or more components.

In the case of a multi-pack type coating material, the respective components (respective liquids) each contain one or more ingredients, and are preferably individually packed, and then stored and kept in a state of being charged in a container, such as a can. By mixing the contents of the respective components at the time of coating, the antifouling coating composition can be prepared.

[Antifouling Coating Film and Method of Forming the Same]

The antifouling coating film of the present invention is obtained by curing the antifouling coating composition of the present invention.

The antifouling coating film formed from the present composition is preferably used for the purpose of preventing fouling of the substrate in water. That is, the present composition is preferably an antifouling coating composition for preventing fouling of substrates in water.

Examples of the fouling of the substrate include fouling by aquatic organisms, and the present composition is preferably a coating composition for forming an antifouling coating film used for the purpose of preventing fouling by aquatic organisms.

Specifically, the antifouling coating film of the present invention can be obtained by combining, for example, a coating step of applying the present composition to a substrate or the like, and a curing step of curing by irradiating the applied coating film (the present composition) with active energy rays, and if necessary, a drying step and a step of attaching a cover film or the like.

<Coating Step>

Examples of the method of applying the present composition include a known method such as brush coating, roller coating, spray coating, roll coater coating, flow coater coating, slit coater coating, gravure coater coating, spin coater coating, curtain roll coater coating, electrostatic coating, clip coating, silk printing, and spin coating.

The thickness of the antifouling coating film of the present invention is set such that the finally formed antifouling coating film has the thickness to be described later. The coating film may be formed by coating once, or may be formed by coating twice or more times (two or more coatings).

The thickness of the antifouling coating film of the present invention is not particularly limited; however, it is preferably 5 μm or more, more preferably 10 μm or more, and still more preferably 50 μm or more, and is preferably 1,000 μm or less, more preferably 500 μm or less, and still more preferably 300 μm or less. In the case of such an embodiment, the antifouling coating film of the present invention becomes an antifouling coating film having excellent antifouling property.

<Curing Step>

The present composition can be cured to form an antifouling coating film by irradiation with active energy rays. The active energy ray may be any active energy ray as long as it can act on the photopolymerization initiator (C) to generate active species such as radicals.

Examples of the active energy rays include, in addition to light rays such as far ultraviolet rays, ultraviolet rays, near ultraviolet rays, and infrared rays, electromagnetic waves such as X-rays, y rays, electron beams, proton rays, and neutron rays, and light rays are preferable, of which ultraviolet rays are preferable in terms of curing speed, availability of irradiation apparatus, price, and the like.

In one embodiment, examples of light source used for light irradiation include an LED lamp, an ultra-high pressure, high pressure, medium pressure or low pressure mercury lamp, a metal halide lamp, a xenon lamp, a carbon arc lamp, a fluorescent lamp, a tungsten lamp, a chemical lamp, an electrodeless lamp, and sunlight.

The irradiation intensity of the active energy rays is usually 10 $mW/cm^2$ or more and 10,000 $mW/cm^2$ or less, and the cumulative irradiation dose is usually 50 $mJ/cm^2$ or more and 10,000 $mJ/cm^2$ or less.

In the curing step, in order to suppress the effect of curing inhibition due to oxygen of the active species generated by the active energy rays, it is preferable to irradiate the active energy rays in an atmosphere of an inert gas such as nitrogen, or in a state where a cover film, a separator, etc., which will be described later, is adhered.

<Drying Step>

In the case where the present composition contains a volatile component such as the non-reactive solvent (E), a drying step may be included for the purpose of volatilizing the volatile component in the applied coating composition when forming the antifouling coating film.

The drying step may be carried out under any conditions as long as the volatile component can be volatilized. For example, drying may be performed by heating at a temperature of 30° C. or higher and 120° C. or lower.

The drying step may be performed before or after the curing step. Moreover, the drying step may be partially performed before the curing step, and the drying step may be performed after the curing step.

<Adhering Step>

In forming the antifouling coating film, a step of attaching a cover film, a separator (release film, release paper), a mold film and the like to a wet coating film of the applied coating composition or the cured antifouling coating film may be included for the purpose of improving the curability in the curing step, protecting the antifouling coating film and forming the surface shape.

<Antifouling Coating Film Having Surface Microstructure>

The antifouling coating film of the present invention may have a surface microstructure for the purpose of improving water flow resistance and the like.

The antifouling coating film having a surface microstructure can be obtained, for example, by applying a coating composition to a substrate or the like, and then contacting a mold film or a mold roll having an inverted structure of the formed surface microstructure, and in that state, irradiating with active energy rays to perform a curing reaction.

A riblet structure as described in WO 2019/189412 A is preferable as the surface uneven structure.

The formation of the antifouling coating film having the surface microstructure is often produced by line production. The present composition is preferable in that it can be produced by line production at a higher speed due to its extremely fast curability. In addition, since the present composition can be designed to have a low content of volatile components such as the non-reactive solvent (E), the present composition is preferable in that problems such as generation of air bubbles in the coating film due to volatilization of volatile components are less likely to occur even when the curing reaction is performed under sealed conditions in contact with the mold film.

[Laminated Antifouling Coating Film]

The laminated antifouling coating film of the present invention includes the aforementioned antifouling coating film and an underlying coating film that is in contact with at least a part of the antifouling coating film. The underlying coating film of the present invention can be formed by curing the underlying coating composition.

<Underlying Coating Composition>

The underlying coating composition of the present invention may be an active energy ray-curable composition or other curable compositions such as condensation reaction-curable and addition reaction-curable compositions.

When an active energy ray-curable composition is used as the underlying coating composition of the present invention, the composition thereof may be in the same manner as the antifouling coating film of the present invention. For example, the composition may be a composition in which components are adjusted so as to emphasize adhesion rather than antifouling property, weather resistance, and the like. By forming a laminated antifouling coating film using the underlying coating composition, the features of the antifouling coating film and the underlying coating film can be complemented, and a well-balanced laminated antifouling coating film can be obtained.

The underlying coating film may be a single layer or a multiple layer consisting of two or more layers that are the same with or different from each other.

As the underlying coating composition of the present invention, other curable compositions such as condensation reaction curable and addition reaction curable compositions may be used. When a laminated antifouling coating film using the underlying coating composition is used, it is possible to obtain a laminated antifouling coating film having a function that is difficult to impart to a photocurable coating film because of poor curing due to shielding of active energy rays and the like. When the underlying coating composition contains, for example, of the inorganic filler (J) those having low transmittance in active energy rays, it is possible to form a laminated antifouling coating film to which light resistance and opacity that cannot be obtained with the antifouling coating film alone are imparted.

From the viewpoint of improving the adhesion between the antifouling coating film and the underlying coating film, the underlying coating composition preferably contains the non-photocurable organopolysiloxane (N1), and from the viewpoint of being able to exhibit high antifouling property over a long period of time by gradually permeating the fouling coating film, the underlying coating composition also preferably contains the organism repellent (O).

[Anti-Fouling Tape]

The antifouling tape of the present invention has the antifouling coating film or the laminated antifouling coating film and a pressure-sensitive adhesive layer (v), and the pressure-sensitive adhesive layer (v) is optionally provided via an intermediate layer (w) on one surface of the antifouling coating film or on a surface of the underlying coating film of the laminated antifouling coating film opposite to the surface in contact with the antifouling coating film. The antifouling tape may have a structure in which the antifouling coating film or the underlying coating film of the laminated antifouling coating film and the pressure-sensitive adhesive layer (v) are directly laminated, or may have a structure in which the antifouling coating film or the underlying coating film of the laminated antifouling coating film and the pressure-sensitive adhesive layer (v) are laminated via the intermediate layer (w).

<Intermediate Layer (w)>

Examples of the intermediate layer (w) include at least one selected from the group consisting of a bonding layer, a barrier layer and a substrate layer. The bonding layer has a function of enhancing the bonding force between an upper layer and a lower layer of the intermediate layer, the barrier layer has a function of reducing the migration of water and other liquid matters through the intermediate layer, and the substrate layer has a function of enhancing the strength of the laminated antifouling coating film. The intermediate layer (w) may have two or more of these functions in a single layer.

The intermediate layer (w) may be one layer or two or more layers as long as it is provided between the antifouling coating film or the underlying coating film of the laminated antifouling coating film and the pressure-sensitive adhesive layer (v). In the case where two or more layers are laminated, the two or more layers may be the same with or different from each other, and may be laminated in any order.

As the intermediate layer (w), those having a function as a bonding layer can be used without limitation as long as they have excellent adhesion to the upper and lower layers of the intermediate layer, and examples thereof include a layer obtained by drying and curing a commercially available tie-coating or primer. In particular, in the case where the intermediate layer is in contact with an antifouling coating film containing a curable organopolysiloxane as the upper layer, a silicone resin tie-coating or a silicone primer is preferably used.

As the intermediate layer (w), those functioning as the barrier layer can be used without limitation, as far as the layer has an excellent function of reducing the migration of water and other liquid matters through the intermediate layer, and examples thereof include a commercially available anticorrosion coating material and a water vapor barrier layer described in JP 2015-224334 A.

As the intermediate layer (w), those functioning as the substrate layer can be used without limitation, as far as the layer has a function of enhancing the strength of the laminated antifouling coating film, and examples thereof include a layer described in JP 2013-194124 A.

Examples of the intermediate layer (w) include a material such as a resin, a metal, paper, a nonwoven fabric, a woven fabric, and glass, or a coating film, a film, and a sheet constituted by a composite material obtained by combining these materials.

Examples of the resin used as the material of the intermediate layer (w) include a silicone resin; an acrylic resin; a polyolefin resin; a polyvinyl resin; a (co)polymer of an unsaturated monomer, such as polystyrene; a polyester resin, such as polyethylene terephthalate, polybutylene terephthalate, and polyethylene naphthalate; a polyurethane resin; an epoxy resin; a polyacetal; a polycarbonate; an acetyl cellulose; and a composite material thereof.

Examples of the metal constituting the intermediate layer (w) include ones constituted by one or more kinds of various metal elements selected from the group consisting of iron, aluminum, titanium, copper, and the like.

Examples of the paper constituting the intermediate layer (w) include non-coated paper for printing, such as high-quality paper and medium-quality paper, and coated paper, such as art paper and coat paper, and also include ones referred to as Japanese paper and tissue paper.

Among these, for the intermediate layer (w) that mainly functions as the bonding layer, a resin is preferably used as the material therefor, and a silicone resin and a (co)polymer of an unsaturated monomer are preferably used as the material therefor, from the standpoint of the adhesion and the convenience in production; for the intermediate layer (w) that mainly functions as the barrier layer, a resin is preferably used as the material therefor, and a silicone resin, a (co)polymer of an unsaturated monomer, and an epoxy resin are more preferably used as the material therefor, from the standpoint of the water resistance and the convenience in production; and for the intermediate layer (w) that mainly functions as the substrate layer, a resin, a metal, and paper are preferably used as the material therefor, and in the case where a resin is used as the substrate, a (co)polymer of an unsaturated monomer and a polyurethane resin are more preferred.

<Pressure-Sensitive Adhesive Layer (v)>

The pressure-sensitive adhesive layer (v) used may be any appropriate pressure-sensitive adhesive layer within such a range that does not impair the effects of the present invention, and for example, the pressure-sensitive adhesive layer described in JP 2013-194124 A may be used. Examples of the material for the pressure-sensitive adhesive layer (v) include an acrylic resin pressure-sensitive adhesive, an epoxy resin pressure-sensitive adhesive, an amino resin pressure-sensitive adhesive, a vinyl resin (such as a vinyl acetate polymer) pressure-sensitive adhesive, a curable acrylic resin pressure-sensitive adhesive, and a silicone resin pressure-sensitive adhesive. The material for the pressure-sensitive adhesive layer may be used alone or as a combination of two or more kinds thereof.

In addition, as the pressure-sensitive adhesive layer (v), a commercially available product as a substrateless tape can be used, and examples thereof include a substrateless silicone tape "NSD-100", manufactured by Nippa Co., Ltd.

The thickness of the pressure-sensitive adhesive layer (v) is preferably 10 μm or more, more preferably 20 μm or more, and is preferably 150 μm or less, more preferably 100 μm or less, from the standpoint of the pressure-sensitive adhesive force and the handleability.

The pressure-sensitive adhesive force of the pressure-sensitive adhesive layer (v) in the antifouling tape of the present invention is preferably 5 N/25 mm or more and 30 N/25 mm or less. The pressure-sensitive adhesive force of the pressure-sensitive adhesive layer is the pressure-sensitive adhesive force to SUS 304 as an adherend at a peeling angle of 180° according to JIS Z0237:2009.

The antifouling tape may have the structures described in JP 2013-194124 A and JP 2016-124994 A.

The antifouling tape of the present invention may be produced by applying the present composition to a pressure-sensitive adhesive tape in which the intermediate layer (w) and the pressure-sensitive adhesive layer (v) are formed in advance and curing the present composition. As the pressure-sensitive adhesive tape, a commercially available product can be used, and examples thereof include "Polyester film adhesive tape 631S #100" (a tape with a total thickness of 0.15 mm composed of a polyester film with a thickness of 0.1 mm and an acrylic adhesive layer), "Glass cloth adhesive tape 540S 0.18" (a tape composed of a glass cloth with a thickness of 0.13 mm and a silicone adhesive layer), "Kapton (registered trademark) adhesive tape 650S #50" (a tape with a total thickness of 0.08 mm composed of a polyimide film with a thickness of 0.05 mm and a silicone adhesive layer), and "Silicone Rubber Adhesive Tape 9013 0.1" (a tape with a total thickness of 0.1 mm in which a silicone rubber, a polyester film, and an acrylic adhesive are laminated in this order), all of which are manufactured by Teraoka Seisakusho Co., Ltd.

The antifouling tape of the present invention has a short curing time because the present composition is photocurable, and can be produced at a high speed in the case of line production, which is very economically advantageous.

[Substrate with Antifouling Coating Film and Method of Producing Same]

The substrate with an antifouling coating film of the present invention is one including the antifouling coating film, the laminated antifouling coating film or the antifouling tape of the present invention on a substrate.

Although a method of producing the substrate with an antifouling coating film of the present invention is not particularly limited, it can be obtained by, for example, a method of applying the present composition to a substrate and curing the present composition to directly obtain the substrate with an antifouling coating film, or a method of adhering a pre-formed antifouling coating film or laminated antifouling film to a substrate, or a method of adhering an antifouling tape to a substrate.

The substrate is preferably used in water, and is more preferably used in a wide range of industrial fields such as ships, fisheries, underwater structures, etc., for the purpose of long-term antifouling of the substrate. Therefore, examples thereof include a ship (an outside shell of a ship's hull of a large scale steel-hulled ship, such as a container ship and a tanker, a fishing boat, an FRP boat, a wooden vessel, and a yacht; including a newly built ship and a repaired ship), a fishing material (such as a rope, a fishing net, a fishing gear, a float, and a buoy), a petroleum pipeline, a water conduit, a water circulation pipe, a diver suit, a swimming goggle, an oxygen cylinder, a swim suit, a torpedo, a structure such as a feed-water and drainage port for a thermal power or nuclear power plant, a marine cable, a power transmission cable, a seawater utilization equipment (such as a seawater pump), a mega-float, a coastal road, an undersea tunnel, seaport equipment, and underwater structures such as structures for various marine civil engineering works in a canal, a water channel, or the like.

Of these, a ship, an underwater structure, and a fishing material are preferable, and a ship and an underwater structure are more preferable.

The material of the substrate is not particularly limited, and examples thereof include a polyester resin such as PET (polyethylene terephthalate) and PEN (polyethylene naphthalate); a polyolefin resin such as polyethylene, chlorinated polyethylene, and polypropylene; polycarbonate, polyamide, polyimide, an ABS resin, a polystyrene resin, polyurethane, plastics mainly composed of an acrylic resin and the like, natural rubber, butyl rubber, halogenated butyl rubber, ethylene propylene rubber, chloroprene rubber, styrene butadiene rubber, nitrile rubber, chlorosulfonated polyethylene, epichlorohydrin rubber, acrylic rubber, silicone rubber, fluororubber, urethane rubber, glass, ceramic materials, composite materials such as glass fiber reinforced plastics, wood, and paper.

In order to improve the adhesion to the substrate and the underlying coating film, an object to be coated may be subjected to a surface treatment before the coating composition of the present invention is applied. Examples of the surface treatment include a corona discharge treatment, a plasma treatment, an electron beam treatment such as ultraviolet rays and excimer laser, a light cleaning treatment, a flame treatment, an ozone treatment, a cleaning treatment using water or an organic solvent, an acid/alkali treatment, and a polishing treatment.

[Anti-Fouling Method]

The antifouling method of the present invention uses the above-described antifouling coating film, laminated antifouling coating film, or antifouling tape. The antifouling method is a method of antifouling by providing an antifouling coating film, a laminated antifouling coating film, or an antifouling tape on various substrates to be antifouled.

EXAMPLES

Hereinafter, the present invention will be described more specifically with reference to Examples; however, the present invention is not limited by these Examples. In the following description, "parts" means "parts by mass" unless otherwise contrary to the spirit.

In addition, the "solid content" of each component or the present composition in the description herein refers to components excluding a volatile component contained as a solvent in each component or the present composition, and has the same meaning as that obtained by drying each component or the present composition in a hot air dryer at 125° C. for 1 hour.

[Components of Antifouling Coating Composition]

The components used in the coating composition are shown in Table 1.

TABLE 1

| | | Compound name or product name | Chemical formula, characteristics, and manufacturer, etc. |
|---|---|---|---|
| (A) | Photocurable organopolysiloxane | Dual-end acrylate silicone 1 | "TEGO Rad 2650" manufactured by Evonik Industries AG<br>Mw: 17,000, Mn: 7,000, functional group number: 4<br>Viscosity (23° C.): 380 mPa · s |
| | | Side-chain acrylate silicone | "SILMER OH ACR C50" manufactured by Siltech Corporation<br>Mw: 24,000, Mn: 15,000, functional group number: 3<br>Viscosity (23° C.): 550 mPa · s |
| | | Dual-end acrylate silicone 2 | "SILMER OH ACR Di-400" manufactured by Siltech Corporation<br>Mw: 31,000, Mn: 17,000, functional group number: 2<br>Viscosity (23° C.): 1,030 mPa · s |
| (B) | Slipping agent | Polyether-modified organopolysiloxane | "KF-6020" manufactured by Shin-Etsu Chemical Co., Ltd.<br>Proportion of polyether partial structure: 20% by mass<br>Kinetic viscosity (25° C.): 180 $mm^2$/sec |
| | | Phenyl-modified organopolysiloxane | "KF-50-100cs" manufactured by Shin-Etsu Chemical Co., Ltd.<br>Phenyl modification rate: 5%, kinetic viscosity (25° C.): 100 $mm^2$/sec |
| (C) | Photopolymerization initiator | Omnirad TPO H | "Omnirad TPO H" manufactured by IGM Resins B.V.,<br>2,4,6-trimethylbenzoyldiphenylphosphine oxide |
| (D) | Silane coupling agent | Acrylate silane | "KBM-5103" manufactured by Shin-Etsu Chemical Co., Ltd.,<br>3-acryloyloxypropyltrimethoxysilane |
| | | Aminosilane | "KBM-903" manufactured by Shin-Etsu Chemical Co., Ltd.,<br>3-aminopropyltrimethoxysilane |
| (E) | Non-reactive solvent | Xylene | — |
| (F) | Polymerization inhibitor | BHT | 2,6-di-tert-butyl cresol |
| (M) | Photopolymerizable monomer | EO4 tetraacrylate | "Sartomer SR494" manufactured by Sartomer Corporation,<br>ethoxylated (4) pentaerythritol tetraacrylate |
| | | Acrylic acid | "98% acrylic acid" manufactured by Toagosei Co., Ltd. |
| | | NCO acrylate | "Karenz (registered trademark) AOI" manufactured by Showa Denko K.K.<br>2-acryloyloxyethyl isocyanate |

TABLE 1-continued

| | | Compound name or product name | Chemical formula, characteristics, and manufacturer, etc. |
|---|---|---|---|
| | | 4-HBA | "4-HBA" manufactured by Osaka Organic Chemical Industry, Ltd. 4-hydroxybutyl acrylate |
| | | ACMO | "ACMO" manufactured by KJ Chemicals Corporation acryloyl morpholine |
| (N1) | Other oligomer/polymer | Deoxime reaction curable silicone | "KE-441" manufactured by Shin-Etsu Chemical Co., Ltd. |

Acrylic Polymer (B2) Having Hydrophilic Group

Synthesis Example 1: Synthesis of Polymer (B21)

In a reaction vessel equipped with a stirrer, a reflux condenser, a thermometer, a nitrogen introducing tube, and a dropping funnel, 42.9 parts by mass of methyl amyl ketone was charged and was heated till the liquid temperature reached 100° C. while stirring under normal pressure and a nitrogen atmosphere. While keeping the temperature of the reaction mixture in a range of 100±5° C., a mixture composed of 40.0 parts by mass of NK ester AM-90G (methoxypolyethylene glycol acrylate, average polyethylene glycol unit number: 9, manufactured by Shin-Nakamura Chemical Co., Ltd.), 60.0 parts by mass of isobutyl acrylate, and 4.0 parts by mass of 2,2'-azobis(2-methylbutyronitrile) was added dropwise into the reaction vessel over 4 hours. Thereafter, the reaction mixture was stirred for 2 hours while keeping the temperature at 100±5° C. to obtain a solution of a polymer (B21). The resulting solution had a solid content of 70.3% by mass, and a viscosity of 109 mPa·s, and the weight average molecular weight (Mw) of the polymer (B21) was 9,100.

Synthesis Example 2: Synthesis of Polymer (B22)

In a reaction vessel equipped with a stirrer, a reflux condenser, a thermometer, a nitrogen introducing tube, and a dropping funnel, 42.9 parts by mass of methyl amyl ketone was charged and was heated till the liquid temperature reached 100° C. while stirring under normal pressure and a nitrogen atmosphere. While keeping the temperature of the reaction mixture in a range of 100±5° C., a mixture composed of 30.0 parts by mass of Viscoat #MTG (methoxy polyethylene glycol acrylate, average polyethylene glycol unit number: 3, manufactured by Osaka Organic Chemical Industry Co., Ltd.), 70.0 parts by mass of Silaplane FM-0711 (manufactured by JNC Corporation, a methacrylate group-containing dimethylpolysiloxane, number average molecular weight: 1,000), and 4.0 parts by mass of 2,2'-azobis(2-methylbutyronitrile) was added dropwise into the reaction vessel over 4 hours. Thereafter, the reaction mixture was stirred for 2 hours while keeping the temperature at 100±5° C. to obtain a solution of a polymer (B22). The resulting solution had a solid content of 69.0% by mass, and a viscosity of 35 mPa·s, and the weight average molecular weight (Mw) of the polymer (B22) was 11,100.

(Solid Content of Polymer Solution)

The solid content (% by mass) was obtained by dividing the mass of the solid content obtained by drying the polymer solution at 125° C. and 1 atmosphere for 1 hour by the mass of the polymer solution before drying.

(Viscosity of Polymer Solution)

The viscosity (mPa·s) of the polymer solution at a liquid temperature of was measured using an E-type viscometer (TV-25, manufactured by Told Sangyo Co., Ltd.).

(Average Molecular Weight of Polymer)

The weight average molecular weight (Mw) of the polymer was measured using gel permeation chromatography (GPC) under the following condition.

(GPC Condition)

- Equipment: "HLC-8320GPC" (manufactured by Tosoh Corporation)
- Columns: "TSK gel guard column SuperMPHZ-M" (manufactured by Tosoh Corporation)×1+"TSK gel Super MultiporeHZ-M" (manufactured by Tosoh Corporation)×2
- Eluent: Tetrahydrofuran (THF)
- Flow rate: 0.35 ml/min
- Detector: RI
- Column thermostat chamber temperature: 40° C.
- Standard substance: Polystyrene
- Preparation method of sample: After adding an eluent to each polymer solution obtained, the filtrate obtained by filtering through a membrane filter was designated as a sample for the GPC measurement.

Examples 1 to 16 and Comparative Examples 1 and 2

<Production of Antifouling Coating Composition>

An antifouling coating composition was prepared by mixing and stirring the respective components according to the blending amounts (parts by mass) described in Table 2.

<Fabrication of Test Panel With Coating Film>

To a sand-blasted steel panel (length 100 mm×width 70 mm×thickness 2.3 mm), an epoxy-based anticorrosion undercoat paint ("BANNOH 500", manufactured by Chugoku Marine Paints, Ltd.) was applied such that the thickness of the dry film thereof was about 100 μm, and was then dried for one day to form an underlying coating film. Thereafter, a silicone-based intermediate coating ("CMP BIOCLEAN R") was applied such that the thickness of the dry film thereof was about 100 μm, and was then dried at 5° C. for 2 hours to form an intermediate coating film. Subsequently, the antifouling coating compositions of Examples 1 to 16 and Comparative Examples 1 and 2 were applied onto the intermediate coating film at 5° C. using a film applicator such that the film thickness after curing was 200 μm. Then, a separator was attached thereto, and ultraviolet irradiation (LED-UV with a wavelength of 365 nm, irradiation intensity of about 500 mW/cm 2, irradiation time of 3 seconds) was performed to obtain a test panel with a coating film.

<Adhesion Evaluation>

After 12 hours from the fabrication of the test panel, on the surface of the coating film of the test panel fabricated using the antifouling coating compositions of Examples 1 to 10 and Comparative Examples 1 and 2, a single-character incision was made to reach the underlying coating film using a single blade specified in JIS K5600-5-6. Thereafter, a paper cloth was used to rub 10 times in a direction perpendicular to the incision, and the occurrence of delamination from the underlying/intermediate coating film was evaluated for adhesion (standard) according to the following criteria.

(Evaluation Point)

3: Delamination occurred in the range of less than 1 mm from the incision

2: Delamination occurred in the range of 1 mm or more and less than 3 mm from the incision 1: Delamination occurred continuously over a range of 3 mm or more from the incision 0: Already peeled off and no coating film existed (Evaluation of Antifouling Property)

After 24 hours from the fabrication of the test panel using the antifouling coating compositions of Examples 1 to 16 and Comparative Examples 1 and 2, the test panel was placed in the sea (Hiroshima Bay, Seto Inland Sea) at a depth of 1 m from the sea surface with the test surface (antifouling coating film) of the test panel immersed in the direction facing the seabed, and the ratio of the barnacle adhesion area to the entire test surface after 3 months was evaluated by visual observation according to the following evaluation criteria.

(Evaluation Point)

5: There is no adhesion of barnacles

4: The adhesion area of barnacles is less than 10% of the entire test surface

3: The adhesion area of barnacles is 10% or more and less than 30% of the entire test surface 2: The adhesion area of barnacles is 30% or more and less than 80% of the entire test surface 1: The adhesion area of barnacles is 80% or more of the entire test surface <Adhesion Evaluation (Immediately After Irradiation)>

To a sand-blasted steel panel (length 100 mm×width 70 mm×thickness 2.3 mm), an epoxy-based anticorrosion undercoat paint ("BANNOH 500", manufactured by Chugoku Marine Paints, Ltd.) was applied such that the thickness of the dry film thereof was about 100 μm, and was then dried for one day to form an underlying coating film. Thereafter, the antifouling coating compositions of Examples 11 to 16 were applied onto the coating film at 5° C. using a film applicator such that the film thickness after curing was 200 μm. Then, a separator was attached thereto, and ultraviolet irradiation (LED-UV with a wavelength of 365 nm, irradiation intensity of about 500 mW/cm$^2$, irradiation time of 3 seconds) was performed to immediately obtain a test panel for adhesion evaluation.

After 10 seconds from the fabrication of the test panel, on the surface of the coating film of the test panel, a single-character incision was made to reach the underlying coating film using a single blade specified in JIS K5600-5-6. Thereafter, a paper cloth was used to rub 10 times in a direction perpendicular to the incision, and the occurrence of delamination from the underlying coating film was evaluated for adhesion (standard) according to the following criteria.

(Evaluation Point)

3: Delamination occurred in the range of less than 1 mm from the incision

2: Delamination occurred in the range of 1 mm or more and less than 3 mm from the incision 1: Delamination occurred continuously over a range of 3 mm or more from the incision 0: Already peeled off and no coating film existed

TABLE 2-1

| | | | Examples | | | | | | |
|---|---|---|---|---|---|---|---|---|---|
| | | | 1 | 2 | 3 | 4 | 5 | 6 | 7 |
| Coating composition blend (parts by mass) | (A) | Dual-end acrylate silicone 1 | 84.0 | | | 88.0 | 70.0 | 84.0 | 84.0 |
| | | Side-chain acrylate silicone | | 42.0 | | | | | |
| | | Dual-end acrylate silicone 2 | | 42.0 | 84.0 | | | | |
| | (B) | Polyether-modified organopolysiloxane | 5.0 | 5.0 | 5.0 | 1.0 | 5.0 | | |
| | | Phenyl-modified organopolysiloxane | | | | | 14.0 | | |
| | | Polymer (B21) | | | | | | 5.0 | |
| | | Polymer (B22) | | | | | | | 5.0 |
| | (C) | Omnirad TPO H | 2.0 | 2.0 | 2.0 | 2.0 | 2.0 | 2.0 | 2.0 |
| | (D) | Acrylate silane | 1.0 | 1.0 | 1.0 | 1.0 | 1.0 | 1.0 | 1.0 |
| | | Aminosilane | | | | | | | |
| | (E) | Xylene | 8.0 | 8.0 | 8.0 | 8.0 | 8.0 | 8.0 | 8.0 |
| | (F) | BHT | 0.01 | 0.01 | 0.01 | 0.0 | 0.01 | 0.01 | 0.01 |
| | (M) | EO4 tetraacrylate | | | | | | | |
| | (N1) | Moisture-curable silicone | | | | | | | |
| Total (parts by mass) | | | 100.0 | 100.0 | 100.0 | 100.0 | 100.0 | 100.0 | 100.0 |
| Calculated | Solid content in paint (% by mass) | | 92.0 | 92.0 | 92.0 | 92.0 | 92.0 | 90.5 | 90.5 |
| | Content of component (A) in solid content (% by mass) | | 91.3 | 91.3 | 91.3 | 95.7 | 76.1 | 92.8 | 92.8 |
| | Content of component (B) in solid content (% by mass) | | 5.4 | 5.4 | 5.4 | 1.1 | 20.7 | 3.9 | 3.9 |
| | Total content of components (A) and (B) in solid content (% by mass) | | 96.7 | 96.7 | 96.7 | 96.7 | 96.7 | 96.7 | 96.7 |
| Result | Adhesion | | 3 | 3 | 3 | 3 | 3 | 3 | 3 |
| | Antifouling property | | 5 | 5 | 4 | 4 | 4 | 5 | 4 |

| | | | Examples | | | Comparative Examples | |
|---|---|---|---|---|---|---|---|
| | | | 8 | 9 | 10 | 1 | 2 |
| Coating composition blend | (A) | Dual-end acrylate silicone 1 | 78.0 | 85.0 | 68.0 | | 84.0 |
| | | Side-chain acrylate silicone | | | | | |
| | | Dual-end acrylate silicone 2 | | | | | |

TABLE 2-1-continued

| | | | | | | | |
|---|---|---|---|---|---|---|---|
| (parts by mass) | (B) | Polyether-modified organopolysiloxane | | | 1.0 | 5.0 | |
| | | Phenyl-modified organopolysiloxane | | 5.0 | | | |
| | | Polymer (B21) | 5.0 | | | | |
| | | Polymer (B22) | | | | | |
| | (C) | Omnirad TPO H | 2.0 | 2.0 | 2.0 | | 2.0 |
| | (D) | Acrylate silane | 1.0 | | 1.0 | | 1.0 |
| | | Aminosilane | | | | 1.0 | |
| | (E) | Xylene | 8.0 | 8.0 | 8.0 | 10.0 | 13.0 |
| | (F) | BHT | 0.01 | 0.01 | 0.01 | | 0.01 |
| | (M) | EO4 tetraacrylate | 6.0 | | | | |
| | (N1) | Moisture-curable silicone | | | 20.0 | 84.0 | |
| Total (parts by mass) | | | 100.0 | 100.0 | 100.0 | 100.0 | 100.0 |
| Calculated | Solid content in paint (% by mass) | | 90.5 | 92.0 | 72.0 | 5.0 | 87.0 |
| | Content of component (A) in solid content (% by mass) | | 86.2 | 92.4 | 94.4 | 0.0 | 96.6 |
| | Content of component (B) in solid content (% by mass) | | 3.9 | 5.4 | 1.4 | 100.0 | 0.0 |
| | Total content of components (A) and (B) in solid content (% by mass) | | 90.1 | 97.8 | 95.8 | 100.0 | 96.6 |
| Result | Adhesion | | 3 | 2 | 2 | 1 | 3 |
| | Antifouling property | | 4 | 4 | 4 | 1* | 1 |

*In the test panel of Comparative Example 1, the antifouling coating film was peeled off, and thus the underlying anticorrosion coating film was exposed, resulting in poor antifouling property.

TABLE 2-2

| | | | Examples | | | | | |
|---|---|---|---|---|---|---|---|---|
| | | | 11 | 12 | 13 | 14 | 15 | 16 |
| Coating composition blend (parts by mass) | (A) | Dual-end acrylate silicone 1 | 82.0 | 79.0 | 82.0 | 82.0 | 82.0 | 82.0 |
| | | Side-chain acrylate silicone | | | | | | |
| | | Dual-end acrylate silicone 2 | | | | | | |
| | (B) | Polyether-modified organopolysiloxane | 5.0 | 5.0 | 5.0 | 5.0 | 5.0 | 5.0 |
| | | Phenyl-modified organopolysiloxane | | | | | | |
| | | Polymer (B21) | | | | | | |
| | | Polymer (B22) | | | | | | |
| | (C) | Omnirad TPO H | 2.0 | 2.0 | 2.0 | 2.0 | 2.0 | 2.0 |
| | (D) | Acrylate silane | | | | | | 1.0 |
| | | Aminosilane | | | | | | |
| | (E) | Xylene | 9.0 | 9.0 | 9.0 | 9.0 | 9.0 | 8.0 |
| | (F) | BHT | 0.01 | 0.01 | 0.01 | 0.01 | 0.01 | 0.01 |
| | (M) | Acrylic acid | 2.0 | 5.0 | | | | 2.0 |
| | | NCO acrylate | | | 2.0 | | | |
| | | 4-HBA | | | | 2.0 | | |
| | | ACMO | | | | | 2.0 | |
| Total (parts by mass) | | | 100.0 | 100.0 | 100.0 | 100.0 | 100.0 | 100.0 |
| Calculated value | Solid content in paint (% by mass) | | 89.0 | 86.0 | 89.0 | 89.0 | 91.0 | 90.0 |
| | Content of component (A) in solid content (% by mass) | | 92.1 | 91.9 | 92.1 | 92.1 | 90.1 | 91.1 |
| | Content of component (B) in solid content (% by mass) | | 5.6 | 5.8 | 5.6 | 5.6 | 5.5 | 5.6 |
| | Total content of components (A) and (B) in solid content (% by mass) | | 97.8 | 97.7 | 97.8 | 97.8 | 95.6 | 96.7 |
| Result | Adhesion (immediately after irradiation) | | 3 | 3 | 3 | 2 | 2 | 3 |
| | Antifouling property | | 4 | 3 | 3 | 4 | 4 | 4 |

As is clear from the results of the Examples and Comparative Examples, the present composition can form an antifouling coating film having excellent low-temperature adhesion and antifouling property.

The invention claimed is:

1. An antifouling coating composition comprising a photocurable organopolysiloxane (A), a slipping agent (B), and a photopolymerization initiator (C), the photocurable organopolysiloxane (A) having a content in a solid content of the antifouling coating composition of 50% by mass or more and 98% by mass or less.

2. The antifouling coating composition according to claim 1, wherein the photocurable organopolysiloxane (A) has a (meth)acryloyl group.

3. An antifouling coating composition comprising a photocurable organopolysiloxane (A), a slipping agent (B), and a photopolymerization initiator (C), the photocurable organopolysiloxane (A) having a content in a solid content of the antifouling coating composition of 50% by mass or more and 98% by mass or less, wherein the photocurable organopolysiloxane (A) is represented by the following formula (I), $$X_pR^1_{(3-p)}SiO(SiR^1_2O)_m(SiX_qR^1_{(2-q)}O)_nSiX_pR^1_{(3-p)} \quad (I)$$

wherein, in the formula (I), $R^1$'s each independently represent an alkyl group having 1 or more and 10 or less carbon atoms, an aryl group, an aralkyl group, an alkoxy group, or a halogenated alkyl group, X's each independently are a monovalent organic group having one or more (meth)acryloyl groups and containing no silicon atom, m represents 10 or more and 10,000 or less, n represents 0 or more and 50 or less, p's each independently are an integer of 0 or more and 2 or less, q's each independently are 1 or 2, and at least one of p and n is 1 or more.

4. The antifouling coating composition according to claim 1, wherein the photocurable organopolysiloxane (A) has a weight average molecular weight (Mw) of 10,000 or more and 100,000 or less.

5. The antifouling coating composition according to claim 1, wherein the photocurable organopolysiloxane (A) has a functional group equivalent of 300 g/mol or more and 50,000 g/mol or less.

6. The antifouling coating composition according to claim 1, wherein the slipping agent (B) is one or more selected from a group consisting of a phenyl-modified silicone, a polyether-modified silicone, and an acrylic polymer having a hydrophilic group.

7. The antifouling coating composition according to claim 1, wherein the slipping agent (B) has a content in the solid content of the antifouling coating composition of 0.1% by mass or more and 40% by mass or less.

8. The antifouling coating composition according to claim 1, wherein a total content of the photocurable organopolysiloxane (A) and the slipping agent (B) in the solid content of the antifouling coating composition is 70% by mass or more and 99% by mass or less.

9. The antifouling coating composition according to claim 1, further comprising a silane coupling agent (D).

10. An antifouling coating film formed from the antifouling coating composition according to claim 1.

11. A laminated antifouling coating film including an underlying coating film and the antifouling coating film according to claim 10.

12. An antifouling tape including the antifouling coating film according to claim 10 and a pressure-sensitive adhesive layer.

13. A substrate with an antifouling coating film, including the antifouling coating film according to claim 10 on a substrate.

14. The substrate with an antifouling coating film according to claim 13, wherein the substrate is one selected from a group consisting of a ship, an underwater structure, a fishing material, and a cable.

15. A method of producing a substrate with an antifouling coating film, comprising a step of applying the antifouling coating composition according to claim 1 to a substrate, and a step of irradiating the applied coating film with an active energy ray.

16. An antifouling method using the antifouling coating film according to claim 10.

17. An antifouling tape including the laminated antifouling coating film according to claim 11 and a pressure-sensitive adhesive layer.

18. A substrate with an antifouling coating film, including the laminated antifouling coating film according to claim 11 on a substrate.

19. A substrate with an antifouling coating film, including the antifouling tape according to claim 12 on a substrate.

20. The antifouling coating composition according to claim 3, wherein the photocurable organopolysiloxane (A) has a weight average molecular weight (Mw) of 10,000 or more and 100,000 or less and has a number average molecular weight of 3,000 or more and 50,000 or less.

* * * * *